(12) United States Patent
Goodman et al.

(10) Patent No.: US 10,755,225 B2
(45) Date of Patent: Aug. 25, 2020

(54) CONCEPTS FOR MONITORING SHIPMENTS

(71) Applicant: UNITED PARCEL SERVICE OF AMERICA, INC., Atlanta, GA (US)

(72) Inventors: Shannon C. Goodman, Mount Washington, KY (US); David A. Gittings, Roswell, GA (US)

(73) Assignee: UNITED PARCEL SERVICE OF AMERICA, INC., Atlanta ( * ) Notice: Subject to any disclaimer, the term of this patent is extended or adjusted under 35 U.S.C. 154(b) by 923 days.

(21) Appl. No.: 14/452,809

(22) Filed: Aug. 6, 2014

(65) Prior Publication Data
US 2016/0042318 A1 Feb. 11, 2016

Related U.S. Application Data

(63) Continuation of application No. 14/452,752, filed on Aug. 6, 2014.

(51) Int. Cl.
*G06Q 10/08* (2012.01)
*G06Q 50/28* (2012.01)
*G06Q 10/06* (2012.01)

(52) U.S. Cl.
CPC ..... *G06Q 10/0833* (2013.01); *G06Q 10/0635* (2013.01); *G06Q 50/28* (2013.01)

(58) Field of Classification Search
CPC . G06Q 10/0833; G06Q 10/0635; G06Q 50/28
See application file for complete search history.

(56) References Cited

U.S. PATENT DOCUMENTS 6,643,608 B1 11/2003 Hershey et al.
7,536,321 B2 5/2009 Takahashi et al.
(Continued)

FOREIGN PATENT DOCUMENTS

EP 1363222 A2 11/2003
WO WO 1990/011572 A1 10/1990
(Continued)

OTHER PUBLICATIONS

Sheffi et al., "New Software Tools to Manage Risk and Disruptions: Part III" https://web.archive.org/web/20130310074027/http://www.scmr.com/article/new_software_tools_to_manage_risk_and_disruptions_part_iii/ (Year: 2013).*
(Continued)

*Primary Examiner* — Rupangini Singh
(74) *Attorney, Agent, or Firm* — Shook, Hardy & Bacon L.L.P.

(57) ABSTRACT

Various embodiments of the present invention are directed to systems and methods for tracking the location of a shipped item. According to various embodiments, the systems and methods may include features designed to determine whether the shipped item is likely to comply with customer-defined shipping requirements throughout the entire shipping process. In various embodiments, the systems and methods are configured to indicate to a user certain shipments that are likely to arrive without complying with all of the customer-defined shipping requirements, such that a user can take remedial action to minimize or eliminate the likelihood of the shipment failing to comply with the customer-defined shipping requirements.

18 Claims, 21 Drawing Sheets

(56) References Cited

U.S. PATENT DOCUMENTS

| | | | |
|---|---|---|---|
| 7,587,353 B2 | 9/2009 | Melchior et al. | |
| 8,219,466 B2 | 7/2012 | Gui et al. | |
| 2002/0116318 A1 | 8/2002 | Thomas et al. | |
| 2003/0227392 A1* | 12/2003 | Ebert | G06K 17/00 340/8.1 |
| 2005/0165629 A1* | 7/2005 | Bruns | G06Q 10/025 705/6 |
| 2006/0074791 A1 | 4/2006 | Jelaco | |
| 2006/0089869 A1 | 4/2006 | Mundy | |
| 2008/0143552 A1* | 6/2008 | Mallison | E21B 47/06 340/853.1 |
| 2009/0259513 A1* | 10/2009 | Tung | G06Q 10/0633 705/7.27 |
| 2009/0281857 A1 | 11/2009 | Amling et al. | |
| 2010/0182148 A1 | 7/2010 | Fan | |
| 2012/0303543 A1* | 11/2012 | Marcus | G06Q 10/08 705/330 |
| 2012/0310854 A1* | 12/2012 | Cova | G06Q 10/06 705/333 |
| 2013/0103606 A1* | 4/2013 | Holliday | G06Q 50/28 705/333 |
| 2013/0342343 A1 | 12/2013 | Harring et al. | |
| 2014/0012772 A1 | 1/2014 | Pretorius | |
| 2014/0207512 A1 | 7/2014 | Khanzode et al. | |
| 2014/0330737 A1 | 11/2014 | Williams et al. | |
| 2015/0134557 A1* | 5/2015 | Cova | G06Q 10/06 705/333 |

FOREIGN PATENT DOCUMENTS

| | | |
|---|---|---|
| WO | WO 2000/002136 A1 | 1/2000 |
| WO | WO 2000/046728 A2 | 8/2000 |
| WO | 2010/030341 A1 | 3/2010 |

OTHER PUBLICATIONS

International Searching Authority, International Search Report and Written Opinion for International Application No. PCT/US2015/040627, dated Oct. 1, 2015, 10 pages, European Patent Office, The Netherlands.
Non-Final Rejection dated Oct 10, 2017 for U.S. Appl. No. 14/452,752.
CA Office Action dated Dec. 4, 2017 for CA Application No. 2958961.
Non-Final Office Action received for U.S. Appl. No. 14/452,752, dated Nov. 19, 2018, 56 pages.
Summon to Attend Oral Proceeding received for European Patent Application No. 15742507.5, dated Sep. 3, 2018, 8 pages.
Office Action received for Canadian Patent Application No. 2,958,961, dated Nov. 6, 2018, 7 pages.
Non-Final Office Action received for U.S. Appl. No. 14/452,752, dated Dec. 26, 2019, 28 pages.
Office Action received for Canadian Patent Application No. 2,958,961, dated Nov. 8, 2019, 7 pages.
Notice of Allowance received for U.S. Appl. No. 14/452,752, dated May 14, 2020, 27 pages.

* cited by examiner

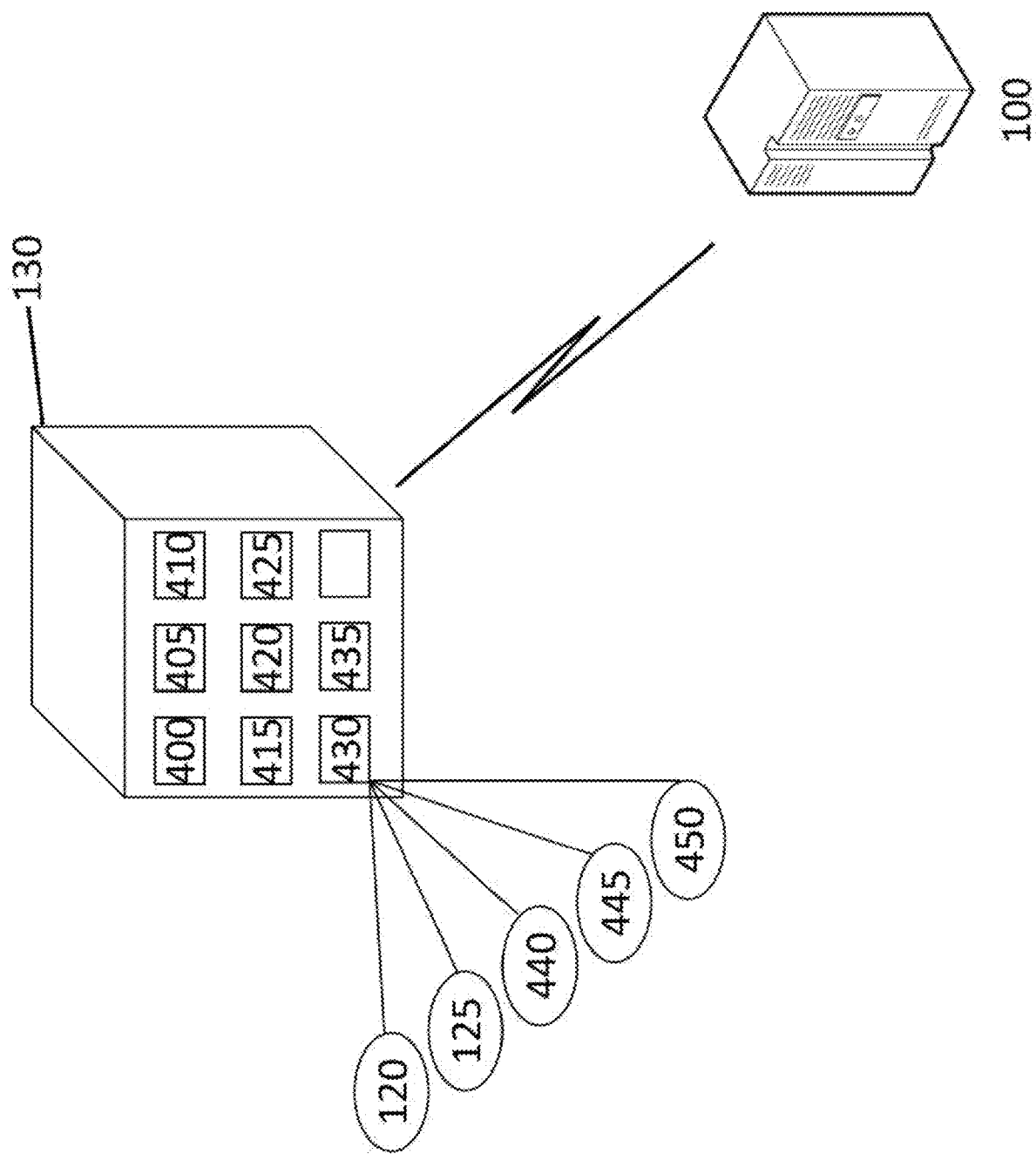

CONCEPTS FOR MONITORING SHIPMENTS

CROSS REFERENCE TO RELATED APPLICATIONS

This patent application is a continuation of patent application Ser. No. 14/452,752 filed Aug. 6, 2014, which is incorporated by reference in its entirety.

BACKGROUND

Shipping customers are increasingly requesting more stringent customer-defined shipping requirements for ensuring items arrive in a desirable condition and at a desired time. Many shipping customers are simultaneously increasing their expectations regarding on-time and in compliance shipping services. Thus, new concepts are needed to ensure items are being shipped according to the customers' customer-defined shipping requirements, and to facilitate carrier personnel undertaking remedial measures if a particular shipment is at risk of arriving at its intended destination not in compliance with the customer-defined shipping requirements.

BRIEF SUMMARY

In general, embodiments of the present invention provide systems, methods, and computer program products for monitoring one or more shipments.

In accordance with one aspect, a system for monitoring a plurality of shipments is provided. In various embodiments, the system comprises one or more memory storage areas and at least one processor, the system configured to: (1) store a plurality of customer profiles, the plurality of customer profiles comprising a first customer profile corresponding to a first customer; (2) receive customer data comprising customer-defined shipping requirements for the first customer; (3) associate at least a portion of the customer data with the first customer profile; (4) receive shipping data for a first shipment, the shipping data comprising data identifying the first customer; (5) associate at least the shipping data for the first shipment with the first customer profile; and (6) determine whether the shipping data for the first shipment indicates that the first shipment is in compliance with the customer-defined shipping requirements applicable to the first shipment based at least in part on the shipping data and the customer data comprising the customer-defined shipping requirements.

In accordance with another aspect, a method for monitoring a plurality of shipments is provided. In various embodiments, the method comprises the steps of: (1) storing a plurality of customer profiles, the plurality of customer profiles comprising a first customer profile corresponding to a first customer; (2) receiving customer data comprising customer-defined shipping requirements for the first customer; (3) associating at least a portion of the customer data with the first customer profile; (4) receiving shipping data for a first shipment, the shipping data comprising data identifying the first customer; (5) associating at least the shipping data for the first shipment with the first customer profile; and (6) determining whether the shipping data for the first shipment indicates that the first shipment is in compliance with the customer-defined shipping requirements applicable to the first shipment based at least in part on the shipping data and the customer data comprising the customer-defined shipping requirements.

In addition, a computer program product for monitoring a plurality of shipments is provided. The computer program product may comprise at least one computer-readable storage medium having computer-readable program code portions stored therein, the computer-readable program code portions comprising computer executable portions configured to: (1) store a plurality of customer profiles, the plurality of customer profiles comprising a first customer profile corresponding to a first customer; (2) receive customer data comprising customer-defined shipping requirements for the first customer; (3) associate at least a portion of the customer data with the first customer profile; (4) receive shipping data for a first shipment, the shipping data comprising data identifying the first customer; (5) associate at least the shipping data for the first shipment with the first customer profile; and (6) determine whether the shipping data for the first shipment indicates that the first shipment is in compliance with the customer-defined shipping requirements applicable to the first shipment based at least in part on the shipping data and the customer data comprising the customer-defined shipping requirements.

In accordance with another aspect of the present invention, a system for monitoring a plurality of shipments is provided. The system may comprise one or more memory storage areas and at least one processor, the system configured to: (1) store a plurality of customer profiles, wherein each of the plurality of customer profiles (a) corresponds to a customer and (b) stores customer-defined shipping requirements for the corresponding customer; (2) receive shipping data for one or more shipments being transported by one or more transporters, the shipping data comprising a transporter identifier; (3) receive location data for each of the one or more transporters, the location data comprising a current location and the transporter identifier for the corresponding transporter; and (4) generate a graphical display comprising a geographical map indicating (a) the current location of each of the one or more transporters and (b) whether at least one of the one or more transporters is transporting an at risk shipment.

In accordance with another aspect of the present invention, a method for monitoring a plurality of shipments is provided. The method may comprise the steps of: (1) storing a plurality of customer profiles, wherein each of the plurality of customer profiles (a) corresponds to a customer and (b) stores customer-defined shipping requirements for the corresponding customer; (2) receiving shipping data for one or more shipments being transported by one or more transporters, the shipping data comprising a transporter identifier; (3) receiving location data for each of the one or more transporters, the location data comprising a current location and the transporter identifier for the corresponding transporter; and (4) generating a graphical display comprising a geographical map indicating (a) the current location of each of the one or more transporters and (b) whether at least one of the one or more transporters is transporting an at risk shipment.

In addition, a non-transitory computer readable storage medium is provided. The non-transitory computer readable storage medium may comprise computer executable instructions for: (1) storing a plurality of customer profiles, wherein each of the plurality of customer profiles (a) corresponds to a customer and (b) stores customer-defined shipping requirements for the corresponding customer; (2) receiving shipping data for one or more shipments being transported by one or more transporters, the shipping data comprising a transporter identifier; (3) receiving location data for each of the one or more transporters, the location data comprising a current location and the transporter identifier for the corresponding transporter; and (4) generating a graphical display comprising a geographical map indicating (a) the current location of each of the one or more transporters and (b) whether at least one of the one or more transporters is transporting an at risk shipment.

BRIEF DESCRIPTION OF THE SEVERAL VIEWS OF THE DRAWINGS

Reference will now be made to the accompanying drawings, which are not necessarily drawn to scale, and wherein:

FIG. 4 is an exemplary schematic diagram of a data collection device according to one embodiment of the present invention;

DETAILED DESCRIPTION

Figure 1:
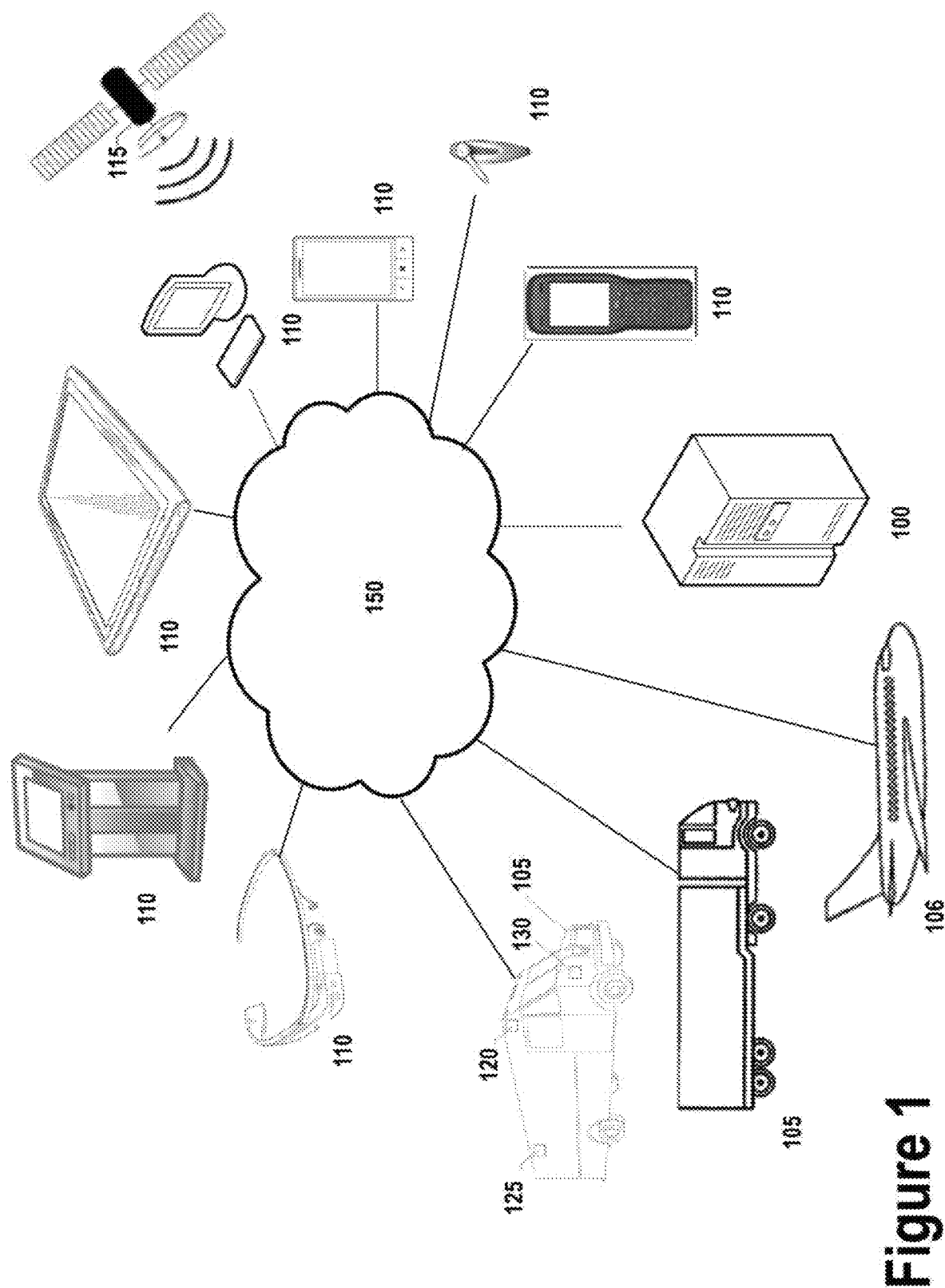
FIG. 1 is an overview of a system that can be used to practice embodiments of the present invention.

Embodiments of the present invention will now be described more fully hereinafter with reference to the accompanying drawings, in which some, but not all embodiments of the invention are shown. Indeed, the invention may be embodied in many different forms and should not be construed as limited to the embodiments set forth herein. Rather, these embodiments are provided so that this disclosure will satisfy applicable legal requirements. Like numbers refer to like elements throughout.

Overview

Embodiments of the present invention relate to a shipment tracking system implemented by a carrier. The carrier system may allow users to view the progress of one or more shipments as they move from an origination to a destination, and determine whether the carrier is likely to deliver the shipment in compliance with customer-specific delivery requirements. For example, the carrier system may be configured to flag a shipment as "at risk" of failing to comply with delivery requirements if it falls behind schedule, or if it is subject to specific predefined requirements. The determination of whether a shipment is behind schedule may be made by determining whether the shipment reaches a particular shipping milestone prior to the expiration of a milestone deadline. If the shipment does not reach the milestone prior to the expiration of the milestone deadline, the carrier system may be configured to flag the shipment as "at risk." In various embodiments, the "at risk" determination may also be made based on other characteristics of the shipment. For example, if a customer indicates that a particular shipment is flammable, temperature sensitive, and/or destined for certain predefined countries, the carrier system may be configured to designate the shipment as "at risk," regardless of whether the shipment is behind or ahead of schedule. Designating shipments as "at risk" when subject to special handling instructions may facilitate the monitoring of these shipments by carrier personnel.

During the setup process, the carrier system receives information regarding customer-specific shipping data, associates this information with a customer profile, and stores the customer profile and associated customer-defined shipping requirements data. As the carrier accepts and transports shipments, the carrier system receives information regarding each shipment and determines any applicable customer-defined shipping requirements based on the stored customer and shipping data. The carrier system receives tracking information regarding the shipment at various points during the shipping process and displays a comparison between the received tracking information and estimated arrival and departure times for various milestones the shipment passes during the shipping process. If a shipment falls behind schedule for one or more milestones, or is otherwise at risk of arriving at the shipment's destination in violation of the customer-defined shipping requirements based on milestones, the carrier system can flag the shipment as "at risk" such that a user can quickly identify at risk shipments and take corrective action.

As will be described in more detail herein, the carrier system may provide real-time location tracking of items as they are transported by a transporter (e.g., a ground, air, or ocean vehicle). The carrier system receives location data from systems located on each transporter, determines which items are located on each transporter, and displays the location of the transporter to a user on a map. A user may be able to view additional information regarding the items located on each transporter by selecting a transporter indicator.

Computer Program Products, Methods, and Computing Entities

Embodiments of the present invention may be implemented in various ways, including as computer program products that comprise articles of manufacture. A computer program product may include a non-transitory computer-readable storage medium storing applications, programs, program modules, scripts, source code, program code, object code, byte code, compiled code, interpreted code, machine code, executable instructions, and/or the like (also referred to herein as executable instructions, instructions for execution, computer program products, program code, and/or similar terms used herein interchangeably). Such non-transitory computer-readable storage media include all computer-readable media (including volatile and non-volatile media).

In one embodiment, a non-volatile computer-readable storage medium may include a floppy disk, flexible disk, hard disk, solid-state storage (SSS) (e.g., a solid state drive (SSD), solid state card (SSC), solid state module (SSM)), enterprise flash drive, magnetic tape, or any other non-transitory magnetic medium, and/or the like. A non-volatile computer-readable storage medium may also include a punch card, paper tape, optical mark sheet (or any other physical medium with patterns of holes or other optically recognizable indicia), compact disc read only memory (CD-ROM), compact disc-rewritable (CD-RW), digital versatile disc (DVD), Blu-ray disc (BD), any other non-transitory optical medium, and/or the like. Such a non-volatile computer-readable storage medium may also include read-only memory (ROM), programmable read-only memory (PROM), erasable programmable read-only memory (EPROM), electrically erasable programmable read-only memory (EEPROM), flash memory (e.g., Serial, NAND, NOR, and/or the like), multimedia memory cards (MMC), secure digital (SD) memory cards, SmartMedia cards, CompactFlash (CF) cards, Memory Sticks, and/or the like. Further, a non-volatile computer-readable storage medium may also include conductive-bridging random access memory (CBRAM), phase-change random access memory (PRAM), ferroelectric random-access memory (FeRAM), non-volatile random-access memory (NVRAM), magnetoresistive random-access memory (MRAM), resistive random-access memory (RRAM), Silicon-Oxide-Nitride-Oxide-Silicon memory (SONOS), floating junction gate random access memory (FJG RAM), Millipede memory, racetrack memory, and/or the like.

In one embodiment, a volatile computer-readable storage medium may include random access memory (RAM), dynamic random access memory (DRAM), static random access memory (SRAM), fast page mode dynamic random access memory (FPM DRAM), extended data-out dynamic random access memory (EDO DRAM), synchronous dynamic random access memory (SDRAM), double data rate synchronous dynamic random access memory (DDR SDRAM), double data rate type two synchronous dynamic random access memory (DDR2 SDRAM), double data rate type three synchronous dynamic random access memory (DDR3 SDRAM), Rambus dynamic random access memory (RDRAM), Twin Transistor RAM (TTRAM), Thyristor RAM (T-RAM), Zero-capacitor (Z-RAM), Rambus in-line memory module (RIMM), dual in-line memory module (DIMM), single in-line memory module (SIMM), video random access memory (VRAM), cache memory (including various levels), flash memory, register memory, and/or the like. It will be appreciated that where embodiments are described to use a computer-readable storage medium, other types of computer-readable storage media may be substituted for or used in addition to the computer-readable storage media described above.

As should be appreciated, various embodiments of the present invention may also be implemented as methods, apparatus, systems, computing devices, computing entities, and/or the like. As such, embodiments of the present invention may take the form of an apparatus, system, computing device, computing entity, and/or the like executing instructions stored on a computer-readable storage medium to perform certain steps or operations. Thus, embodiments of the present invention may also take the form of an entirely hardware embodiment, an entirely computer program product embodiment, and/or an embodiment that comprises combination of computer program products and hardware performing certain steps or operations.

Embodiments of the present invention are described below with reference to block diagrams and flowchart illustrations. Thus, it should be understood that each block of the block diagrams and flowchart illustrations may be implemented in the form of a computer program product, an entirely hardware embodiment, a combination of hardware and computer program products, and/or apparatus, systems, computing devices, computing entities, and/or the like carrying out instructions, operations, steps, and similar words used interchangeably (e.g., the executable instructions, instructions for execution, program code, and/or the like) on a computer-readable storage medium for execution. For example, retrieval, loading, and execution of code may be performed sequentially such that one instruction is retrieved, loaded, and executed at a time. In some exemplary embodiments, retrieval, loading, and/or execution may be performed in parallel such that multiple instructions are retrieved, loaded, and/or executed together. Thus, such embodiments can produce specifically-configured machines performing the steps or operations specified in the block diagrams and flowchart illustrations. Accordingly, the block diagrams and flowchart illustrations support various combinations of embodiments for performing the specified instructions, operations, or steps.

Exemplary Architecture

FIG. 1 provides an illustration of a system that can be used in conjunction with various embodiments of the present invention. As shown in FIG. 1, the system may include one or more carrier systems 100, one or more transporters (e.g., vehicles 105 and/or aircraft 106), one or more user computing entities 110, one or more Global Positioning System (GPS) satellites 115, one or more location sensors 120, one or more telematics sensors 125, one or more data collection devices 130, one or more networks 150, customer/shipper computing entities (not shown), and/or the like. Each of the components of the system may be in electronic communication with one another over the same or different wireless or wired networks including, for example, a wired or wireless Personal Area Network (PAN), Local Area Network (LAN), Metropolitan Area Network (MAN), Wide Area Network (WAN), or the like. Additionally, while FIG. 1 illustrates certain system entities as separate, standalone entities, the various embodiments are not limited to this particular architecture.

Exemplary Carrier System

Figure 2:
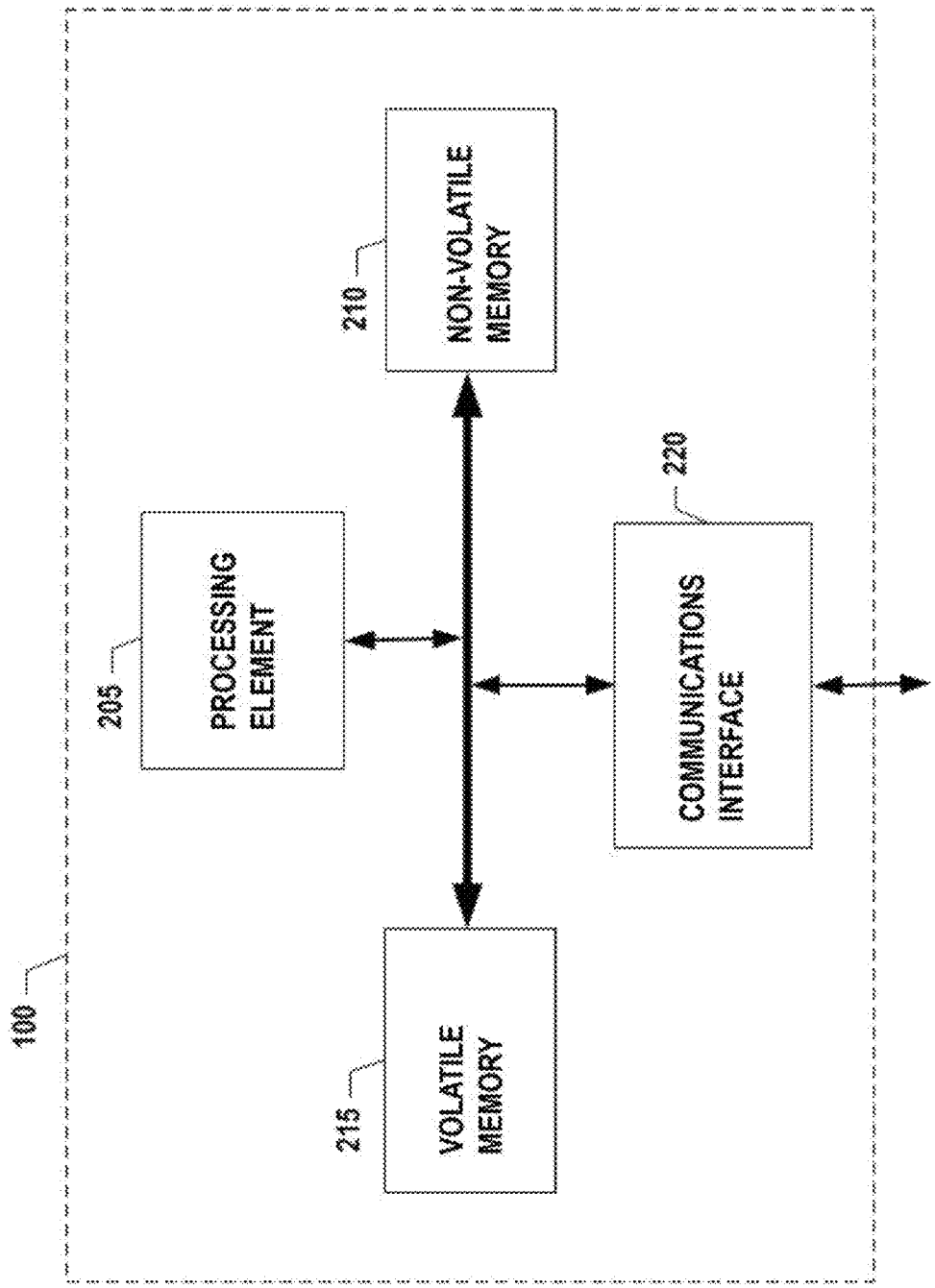
FIG. 2 is an exemplary schematic diagram of a carrier system according to one embodiment of the present invention.

FIG. 2 provides an exemplary schematic of a carrier system 100 according to one embodiment of the present invention. In general, the terms system, computing entity, entity, device, and/or similar words used herein interchangeably may refer to, for example, one or more computers, computing entities, desktops, mobile phones, tablets, phablets, notebooks, laptops, distributed systems, gaming consoles (e.g., Xbox, Play Station, Wii), watches, glasses, key fobs, radio frequency identification (RFID) tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. Such functions, operations, and/or processes may include, for example, transmitting, receiving, operating on, processing, displaying, storing, determining, creating/generating, monitoring, evaluating, comparing, and/or similar terms used herein interchangeably. In one embodiment, these functions, operations, and/or processes can be performed on data, content, information, and/or similar terms used herein interchangeably. The carrier system 100 may also comprise or be associated with various other systems, such as an Address Matching System (AMS), an Internet Membership System (IMS), a Customer Profile System (CPS), a Package Center Information System (PCIS), a Customized Pickup and Delivery System (CPAD), a Web Content Management System (WCMS), a Notification Email System (NES), a Fraud Prevention System (FPS), and a variety of other systems and their corresponding components.

As will be understood from FIG. 2, in one embodiment, the carrier system 100 may include or be in communication with one or more processing elements 205 (also referred to as processors, processing circuitry, and/or similar terms used herein interchangeably) that communicate with other elements within the carrier system 100 via a bus, for example. As will be understood, the processing element 205 may be embodied in a number of different ways. For example, the processing element 205 may be embodied as one or more complex programmable logic devices (CPLDs), microprocessors, multi-core processors, coprocessing entities, application-specific instruction-set processors (ASIPs), microcontrollers, and/or controllers. Further, the processing element 205 may be embodied as one or more other processing devices or circuitry. The term circuitry may refer to an entirely hardware embodiment or a combination of hardware and computer program products. Thus, the processing element 205 may be embodied as integrated circuits, application specific integrated circuits (ASICs), field programmable gate arrays (FPGAs), programmable logic arrays (PLAs), hardware accelerators, other circuitry, and/or the like. As will therefore be understood, the processing element 205 may be configured for a particular use or configured to execute instructions stored in volatile or non-volatile media or otherwise accessible to the processing element 205. As such, whether configured by hardware or computer program products, or by a combination thereof, the processing element 205 may be capable of performing steps or operations according to embodiments of the present invention when configured accordingly.

In one embodiment, the carrier system 100 may further include or be in communication with non-volatile media (also referred to as non-volatile storage, memory, memory storage, memory circuitry and/or similar terms used herein interchangeably). In one embodiment, the non-volatile storage or memory may include one or more non-volatile storage or memory media 210, including but not limited to hard disks, ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. As will be recognized, the non-volatile storage or memory media may store databases, database instances, database management systems, data, applications, programs, program modules, scripts, source code, object code, byte code, compiled code, interpreted code, machine code, executable instructions, and/or the like. Such code may include an operating system, a customer profile module, a user profile module, a shipment tracking module, and a summary module. The terms database, database instance, database management system, and/or similar terms used herein interchangeably may refer to a structured collection of records or data that is stored in a computer-readable storage medium, such as via a relational database, hierarchical database, and/or network database.

In one embodiment, the carrier system 100 may further include or be in communication with volatile media (also referred to as volatile storage, memory, memory storage, memory circuitry and/or similar terms used herein interchangeably). In one embodiment, the volatile storage or memory may also include one or more volatile storage or memory media 215, including but not limited to RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. As will be recognized, the volatile storage or memory media may be used to store at least portions of the databases, database instances, database management systems, data, applications, programs, program modules, scripts, source code, object code, byte code, compiled code, interpreted code, machine code, executable instructions, and/or the like being executed by, for example, the processing element 205. Thus, the databases, database instances, database management systems, data, applications, programs, program modules, scripts, source code, object code, byte code, compiled code, interpreted code, machine code, executable instructions, and/or the like may be used to control certain aspects of the operation of the carrier system 100 with the assistance of the processing element 205 and operating system.

As indicated, in one embodiment, the carrier system 100 may also include one or more communications interfaces 220 for communicating with various computing entities, such as by communicating data, content, information, and/or similar terms used herein interchangeably that can be transmitted, received, operated on, processed, displayed, stored, and/or the like. Such communication may be executed using a wired data transmission protocol, such as fiber distributed data interface (FDDI), digital subscriber line (DSL), Ethernet, asynchronous transfer mode (ATM), frame relay, data over cable service interface specification (DOCSIS), or any other wired transmission protocol. Similarly, the carrier system 100 may be configured to communicate via wireless external communication networks using any of a variety of protocols, such as general packet radio service (GPRS), Universal Mobile Telecommunications System (UMTS), Code Division Multiple Access 2000 (CDMA2000), CDMA2000 1× (1×RTT), Wideband Code Division Multiple Access (WCDMA), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), 802.16 (WiMAX), ultra wideband (UWB), infrared (IR) protocols, near field communication (NFC) protocols, Bluetooth™ protocols, wireless universal serial bus (USB) protocols, and/or any other wireless protocol. Although not shown, the carrier system 100 may include or be in communication with one or more input elements, such as a keyboard input, a mouse input, a touch screen/display input, motion input, movement input, audio input, pointing device input, joystick input, keypad input, and/or the like. The carrier system 100 may also include or be in communication with one or more output elements (not shown), such as audio output, video output, screen/display output, motion output, movement output, and/or the like.

As will be appreciated, one or more of the carrier system's 100 components may be located remotely from other carrier system 100 components, such as in a distributed system. Furthermore, one or more of the components may be combined and additional components performing functions described herein may be included in the carrier system 100. Thus, the carrier system 100 can be adapted to accommodate a variety of needs and circumstances. As will be recognized, these architectures and descriptions are provided for exemplary purposes only and are not limiting to the various embodiments.

Exemplary Aircraft

In various embodiments, the aircraft 106 (such as an airplane, dirigible, helicopter, and/or the like) may include one or more location sensors 120, one or more telematics sensors 125, one or more data collection devices 130, and/or the like.

Referring to FIG. 4, which provides a block diagram of an exemplary data collection device 130, the data collection device 130 may collect location and telematics sensor data and transmit the data to the carrier system 100 via one of several communication methods.

In one embodiment, the data collection device 130 may include, be associated with, or be in communication with one or more processors 400, one or more location-determining devices or one or more location sensors 120 (e.g., GPS, Global Navigation Satellite System (GNSS) sensors, or surface-based or airborne radar), one or more telematics sensors 125, one or more real-time clocks 415, a J-Bus protocol architecture, one or more electronic control modules (ECM) 445, one or more communication ports 430 for receiving data from various sensors (e.g., via a CAN-bus), one or more communication ports 405 for transmitting data, one or more radio frequency identification (RFID) tags 450, one or more power sources 420, one or more data radios 435 for communication with a variety of communication networks, one or more memory modules 410, and one or more programmable logic controllers (PLC) 425. It should be noted that many of these components may be located within the aircraft 106 but external to the data collection device 130. Specifically, many of these components may be located either within or external to the air frame of the aircraft 106.

In one embodiment, the one or more location sensors 120 may be one of several components in communication with or available to the data collection device 130. Moreover, the one or more location sensors 120 may be compatible with Low Earth Orbit (LEO) satellite systems, Department of Defense (DOD) satellite systems, the European Union Galileo positioning systems, the Chinese Compass navigation systems, Indian Regional Navigational satellite systems, and/or the like. Alternatively, triangulation may be used in connection with a device associated with a particular aircraft 106 and/or the aircraft's 106 pilot and with various communication points (e.g., cellular towers or Wi-Fi access points) positioned at various locations throughout a geographic area to determine the location of the aircraft 106 and/or its pilot. The one or more location sensors 120 may be used to receive latitude, longitude, altitude, geocode, course, position, time, acceleration, and/or speed data (e.g., location data). The one or more location sensors 120 may also communicate with the carrier system 100, the data collection device 130, and/or a similar network entity.

As indicated, in addition to the one or more location sensors 120, the data collection device 130 may include or be associated with one or more telematics sensors 125. For example, the telematics sensors 125 may include aircraft sensors, such as engine, fuel, tire pressure, location, altitude, pitch, yaw, weight, door, acceleration, and speed sensors. The telematics data may include, but is not limited to, aircraft speed data, propeller rotational speed data, engine usage data, revolutions per minute (RPM) data, draft data, oil pressure data, seat belt usage data, mileage data, fuel data, and/or the like. The telematics sensors 125 may include environmental sensors, such as air quality sensors, air pressure sensors, humidity sensors, temperature sensors, and/or the like. Thus, the telematics data may also include carbon monoxide (CO), nitrogen oxides (NOx), sulfur oxides (SOx), ozone ($O_3$), hydrogen sulfide ($H_2S$) and/or ammonium ($NH_4$) data and/or meteorological data.

The exemplary aircraft sensors described above may be configured, for example, to operate in any fashion suitable to generate data that may be captured, stored, and transmitted by the data collection device 130 and/or a variety of other entities. In addition, while certain sensors are preferably disposed at particular locations on or within the aircraft 106, other sensors may be disposed anywhere within the aircraft, such as within the data collection device 130 itself (e.g., a location sensor). It should be noted that in some embodiments, the sensors may be located remotely from the aircraft 106 (e.g., a radar-based location sensor). If the location sensor 120 is located remotely from the aircraft 106, the location sensor 120 may be configured to determine the location of the aircraft 106 without communicating with a device located on the aircraft 106. However, in various embodiments wherein the location sensor 120 is located remotely from the aircraft 106, the aircraft 106 may include a transponder, such as a Mode A, Mode C, or Mode S transponder configured to identify the aircraft 106 to the location sensor 120 (e.g., a ground-based radar location sensor).

In one embodiment, the ECM 445 may be one of several components in communication with or available to the data collection device 130. The ECM 445, which may be a scalable and subservient device to the data collection device 130, may have data processing capability to decode and store analog and/or digital inputs from aircraft systems and sensors. The ECM 445 may further have data processing capability to collect and present aircraft data to the J-Bus (which may allow transmission to the data collection device 130), and output standard aircraft diagnostic codes when received from an aircraft's J-Bus-compatible on-board controllers 440 or sensors.

As indicated, a communication port 430 may be one of several components available in the data collection device 130. Embodiments of the communication port 430 may include an Infrared Data Association (IrDA) communication port, a data radio, and/or a serial port. The communication port 430 may receive instructions for the data collection device 130. These instructions may be specific to the aircraft 106 in which the data collection device 130 is installed, specific to the geographical area in which the aircraft 106 will be traveling, or specific to the function the aircraft 106 serves within a fleet of aircraft. In one embodiment, the data radio 435 may be configured to communicate with a WWAN, WLAN, WPAN, Aircraft Communications Addressing and Reporting System (ACARS), or any combination thereof. For example, the data radio 435 may communicate via various wireless protocols, such as 802.11, GPRS, UMTS, CDMA2000, WCDMA, TD-SCDMA, LTE, E-UTRAN, Wi-Fi, WiMAX, UWB, IR protocols, Bluetooth protocols, wireless USB protocols, Very High Frequency (VHF) protocols, and/or any other wireless protocol. Via these communication standards and protocols, the data collection device 130 can communicate with various other entities.

Although the aircraft 106 is illustrated in FIG. 1 as communicating with various entities over the same network 150, these devices may likewise communicate over separate networks.

Exemplary Vehicle

Similar to the aircraft 106, in various embodiments, a vehicle 105 (such as a freight vehicle, train, trans-oceanic ship, boat, barge, submarine, tractor-trailer combination, local delivery vehicle, van, car, truck, hovercraft, and/or the like) may include one or more location sensors, one or more telematics sensors, one or more data collection devices, and/or the like. The location sensors, telematics sensors, and data collection devices associated with the one or more vehicles 105 may contain components and functionality similar to those described above with regard to aircraft 106.

Exemplary User Computing Entity

Figure 3:
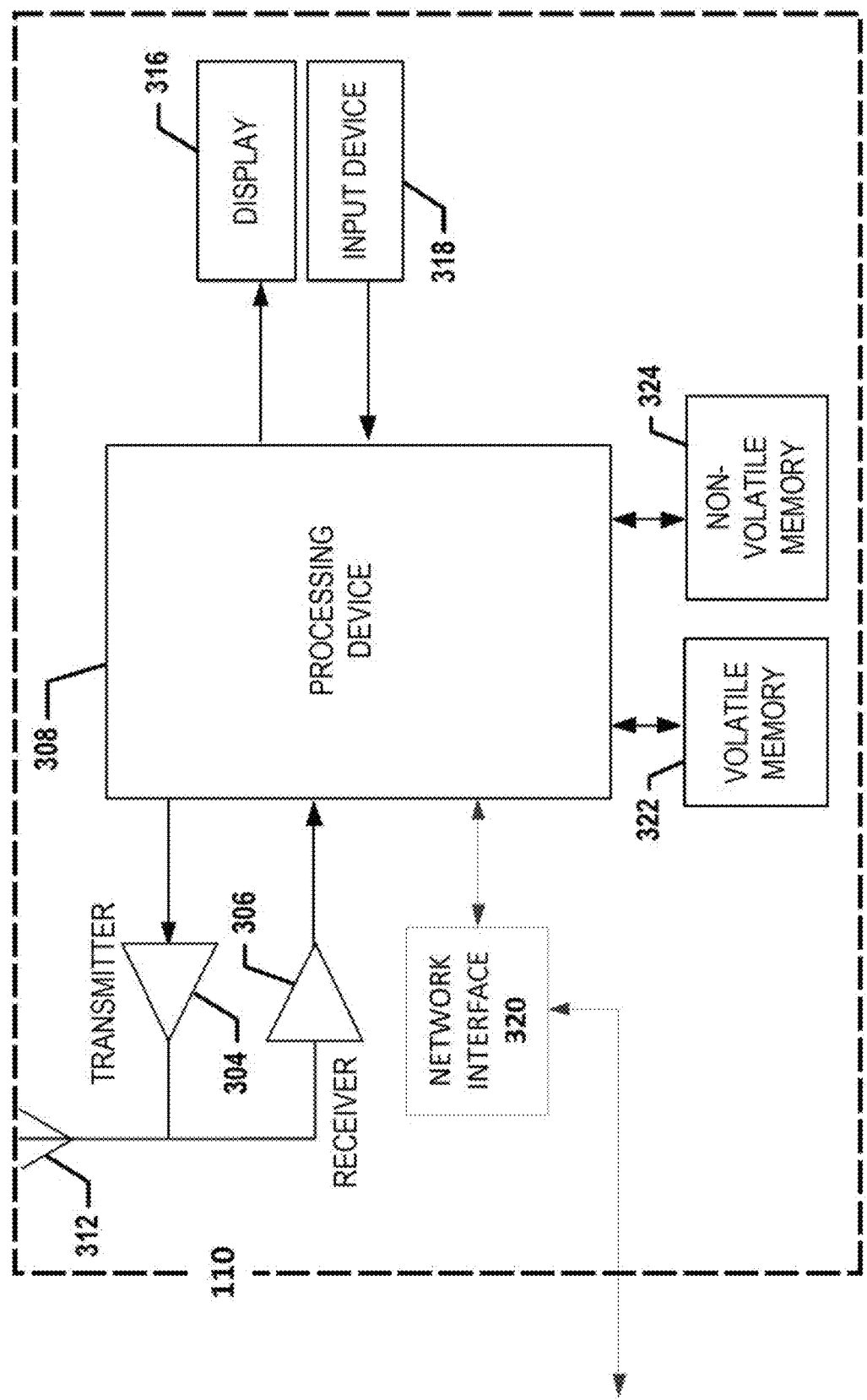
FIG. 3 is an exemplary schematic diagram of a user computing entity according to one embodiment of the present invention.

A user may be an individual, an organization, a department within an organization, a representative of an organization and/or person, and/or the like. In one embodiment, a user may be a carrier employee or contractor. A user may operate a user computing entity 110 that includes one or more components that are functionally similar to those of the carrier system 100. FIG. 3 provides a schematic of a user computing entity 110 according to one embodiment of the present invention. As noted above in referencing the carrier system 100, the term "computing entity" may refer to, for example, one or more computers, computing entities, desktops, mobile phones, tablets, phablets, notebooks, laptops, distributed systems, gaming consoles (e.g., Xbox, Play Station, Wii), watches, glasses, key fobs, RFID tags, ear pieces, scanners, televisions, dongles, cameras, wristbands, kiosks, input terminals, servers or server networks, blades, gateways, switches, processing devices, processing entities, set-top boxes, relays, routers, network access points, base stations, the like, and/or any combination of devices or entities adapted to perform the functions, operations, and/or processes described herein. As shown in FIG. 3, the user computing entity 110 can include an antenna 312, a transmitter 304 (e.g., radio), a receiver 306 (e.g., radio), and a processing element 308 (e.g., CPLDs, microprocessors, multi-core processors, coprocessing entities, ASIPs, microcontrollers, and/or controllers) that provides signals to and receives signals from the transmitter 304 and receiver 306, respectively.

The signals provided to and received from the transmitter 304 and the receiver 306, respectively, may include signaling information in accordance with air interface standards of applicable wireless systems. In this regard, the user computing entity 110 may be capable of operating with one or more air interface standards, communication protocols, modulation types, and access types. More particularly, the user computing entity 110 may operate in accordance with any of a number of wireless communication standards and protocols, such as those described above with regard to the carrier system 100. In a particular embodiment, the user computing entity 110 may operate in accordance with multiple wireless communication standards and protocols, such as UMTS, CDMA2000, 1×RTT, WCDMA, TD-SCDMA, LTE, E-UTRAN, EVDO, HSPA, HSDPA, Wi-Fi, WiMAX, UWB, IR, NFC, Bluetooth™, USB, and/or the like. Similarly, the user computing entity 110 may operate in accordance with multiple wired communication standards and protocols, such as those described above with regard to the carrier system 100 via a network interface 320.

Via these communication standards and protocols, the user computing entity 110 can communicate with various other entities using concepts such as Unstructured Supplementary Service Data (USSD), Short Message Service (SMS), Multimedia Messaging Service (MMS), Dual-Tone Multi-Frequency Signaling (DTMF), and/or Subscriber Identity Module Dialer (SIM dialer). The user computing entity 110 can also download changes, add-ons, and updates, for instance, to its firmware, software (e.g., including executable instructions, applications, program modules), and operating system.

According to one embodiment, the user computing entity 110 may include a location determining aspect, device, module, functionality, and/or similar words used herein interchangeably. For example, the user computing entity 110 may include outdoor positioning aspects, such as a location module adapted to acquire, for example, latitude, longitude, altitude, geocode, course, direction, heading, speed, universal time (UTC), date, and/or various other information/data. In one embodiment, the location module can acquire data, sometimes known as ephemeris data, by identifying the number of satellites in view and the relative positions of those satellites. The satellites may be a variety of different satellites, including LEO satellite systems, DOD satellite systems, the European Union Galileo positioning systems, the Chinese Compass navigation systems, Indian Regional Navigational satellite systems, and/or the like. Alternatively, the location information by be determined by triangulating the user computing entity 110's position in connection with a variety of other systems, including cellular towers, Wi-Fi access points, and/or the like. Similarly, the user computing entity 110 may include may include indoor positioning aspects, such as a location module adapted to acquire, for example, latitude, longitude, altitude, geocode, course, direction, heading, speed, time, date, and/or various other information/data. Some of the indoor systems may use various position or location technologies including RFID tags, indoor beacons or transmitters, Wi-Fi access points, cellular towers, nearby computing devices (e.g., smartphones, laptops) and/or the like. For instance, such technologies may include the iBeacons, Gimbal proximity beacons, Bluetooth Low Energy (BLE) transmitters, Near Field Communication (NFC) transmitters, and/or the like. These indoor positioning aspects can be used in a variety of settings to determine the location of someone or something to within inches or centimeters.

The user computing entity 110 may also comprise a user interface (that can include a display 316 coupled to a processing element 308) and/or a user input interface (coupled to a processing element 308). For example, the user interface may be a user application, browser, user interface, and/or similar words used herein interchangeably executing on and/or accessible via the user computing entity 110 to interact with and/or cause display of information from the carrier system 100, as described herein. The user input interface can comprise any of a number of devices allowing the user computing entity 110 to receive data, such as a keypad 318 (hard or soft), a touch display, voice or motion interfaces, or other input device. In embodiments including a keypad 318, the keypad 318 can include (or cause display of) the conventional numeric (0-9) and related keys (#, *), and other keys used for operating the user computing entity 110 and may include a full set of alphabetic keys or set of keys that may be activated to provide a full set of alphanumeric keys. In addition to providing input, the user input interface can be used, for example, to activate or deactivate certain functions, such as screen savers and/or sleep modes.

The user computing entity 110 can also include volatile storage or memory 322 and/or non-volatile storage or memory 324, which can be embedded and/or may be removable. For example, the non-volatile memory may be ROM, PROM, EPROM, EEPROM, flash memory, MMCs, SD memory cards, Memory Sticks, CBRAM, PRAM, FeRAM, NVRAM, MRAM, RRAM, SONOS, FJG RAM, Millipede memory, racetrack memory, and/or the like. The volatile memory may be RAM, DRAM, SRAM, FPM DRAM, EDO DRAM, SDRAM, DDR SDRAM, DDR2 SDRAM, DDR3 SDRAM, RDRAM, TTRAM, T-RAM, Z-RAM, RIMM, DIMM, SIMM, VRAM, cache memory, register memory, and/or the like. The volatile and non-volatile storage or memory can store databases, database instances, database management systems, data, applications, programs, program modules, scripts, source code, object code, byte code, compiled code, interpreted code, machine code, executable instructions, and/or the like to implement the functions of the user computing entity 110. As indicated, this may include a user application that is resident on the entity or accessible through a browser or other user interface for communicating with the carrier system 100 and/or various other computing entities.

In another embodiment, the user computing entity 110 may include one or more components or functionality that are the same or similar to those of the carrier system 100, as described in greater detail above. As will be recognized, these architectures and descriptions are provided for exemplary purposes only and are not limiting to the various embodiments.

Other Entities

Various other entities may be used with embodiments of the present invention, such as a computing entity for a shipper, consignor, customer, and similar words used herein interchangeably. In one embodiment, each customer computing entity may include one or more processing elements (e.g., CPLDs, microprocessors, multi-core processors, coprocessing entities, ASIPs, microcontrollers, and/or controllers), one or more display device/input devices (e.g., including user interfaces), volatile and non-volatile storage or memory, and/or one or more communications interfaces. For example, the user interface may be a user application, browser, user interface, and/or similar words used herein interchangeably executing on and/or accessible via the carrier system. As will be recognized, these architectures and descriptions are provided for exemplary purposes only and are not limiting to the various embodiments.

Exemplary Operation

Figures 5, 6:
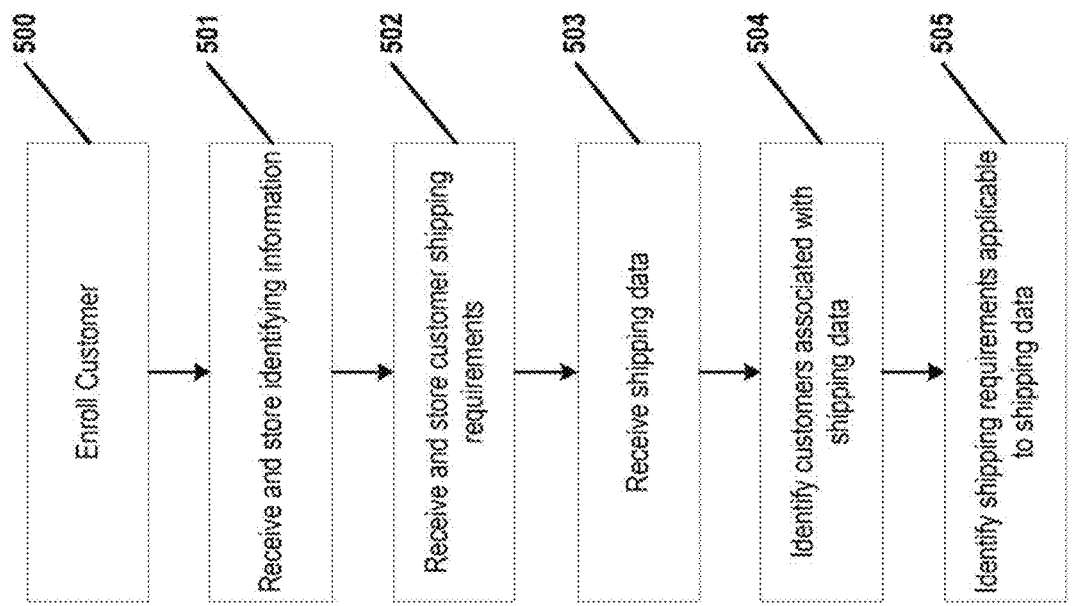
FIGS. 5-7 are flowcharts illustrating operations and processes that can be used in accordance with various embodiments of the present invention.
Figure 7:
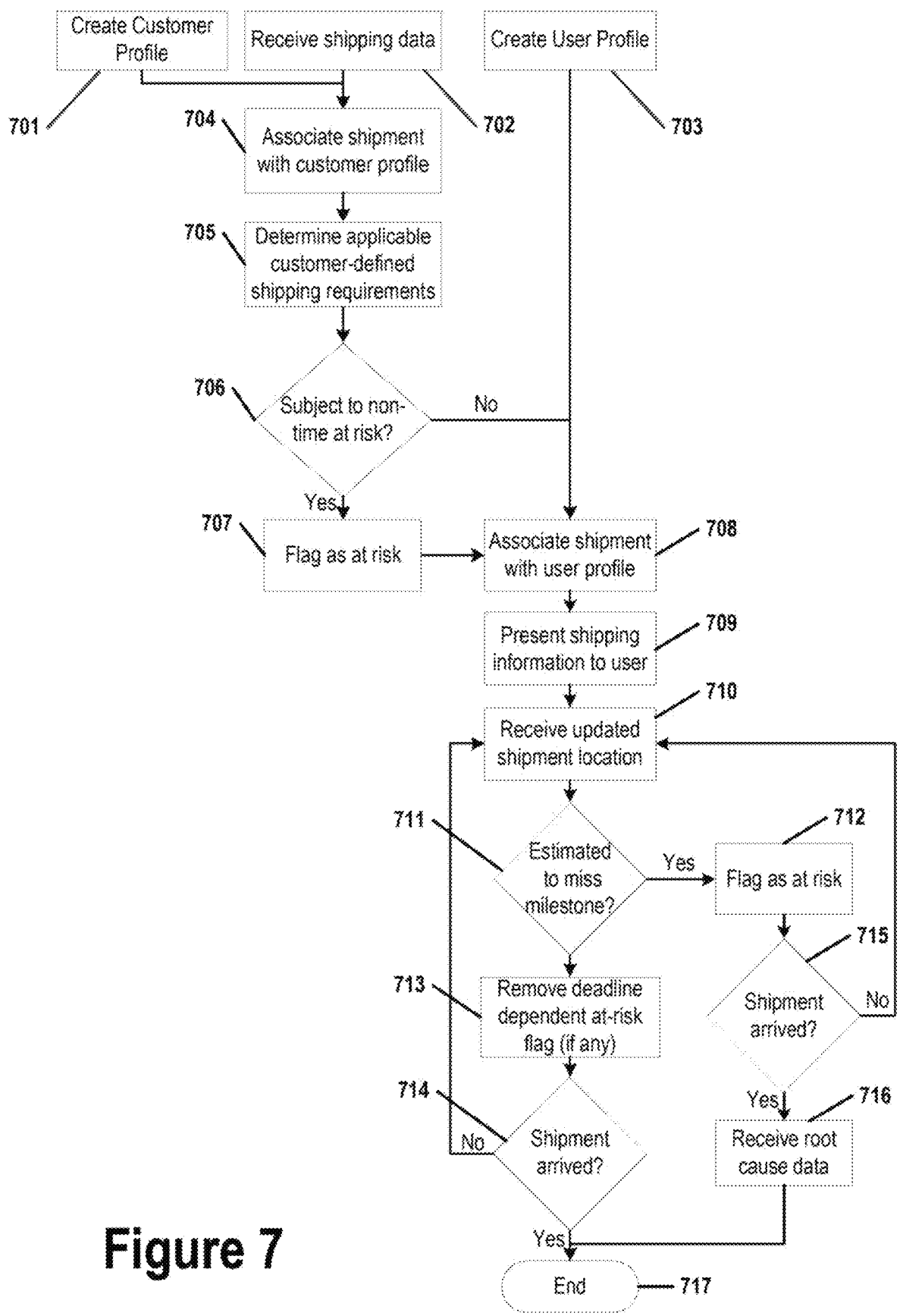

Reference will now be made to FIGS. 5-22. FIG. 5 is a flowchart illustrating exemplary operations for enrolling shippers/customers. FIG. 6 shows exemplary operations for enrolling a user (e.g., carrier personnel), and FIG. 7 is a flowchart of processes and operations that may be involved in generating a shipment, tracking the shipment, and flagging the shipment as "at risk" if it meets certain "at risk" criteria. As will be described in more detail below, FIGS. 8-22 show exemplary input and output in accordance with various embodiments of the present invention.

In certain embodiments, shippers/customers may contract with carriers to transport and deliver various items through the carriers' transportation and logistics networks. As part of this process, a carrier system 100 can receive information regarding the contracts/agreements between the carrier and the various shippers/customers. For example, the carrier system 100 may receive information regarding contracted pricing for shipments, transportation routes, frequency for shipping each shipper's/customer's items, and/or various requirements agreed to under the terms of the contract by the carrier and shipper/customer (e.g., shipping temperature requirements and shipping time requirements). Although the customer is referred to in this context as the shipper, the customer may also be a recipient/consignee in certain circumstances. This contract/agreement information may be used during the shipper/customer enrollment, item and shipper/customer matching, and item tracking procedures described in further detail below.

Shipper/Customer Enrollment

In one embodiment, as indicated in Block 500 of FIG. 5, the process may begin with the enrollment/registration of one or more shippers/customers for a customer shipping program. A shipper/customer may be an individual, a family, a company, an organization, an entity, a department within an organization, a representative of an organization and/or person, and/or the like. To enroll, a shipper/customer may contact a carrier such as United Parcel Service of America, Inc. (UPS) to discuss customer-defined shipping requirements for transporting items and agree upon various contract parameters. For each shipper/customer, the carrier system 100 may generate a shipper/customer profile comprising customer data that may include contractually agreed upon shipping requirements. As will be understood by one skilled in the art, each shipper/customer profile may comprise a separate database entry. The customer data may additionally comprise information regarding customer-defined shipping requirements specific to each shipper/customer. For example, the customer-defined shipping requirements may contain information corresponding to items to be shipped regularly, periodically, and/or continuously transmitted to appropriate recipients/consignees. Thus, for instance, the carrier system 100 may determine when a shipment is scheduled to be picked up without any additional input from a shipper/customer. Each shipper/customer profile may contain various customer-defined shipping requirements applicable to a plurality of shipping lanes. As will be described more fully herein, a shipping lane comprises the route travelled between a particular origin and a particular destination.

In various embodiments, a shipper/customer may be associated with one or more default shipper/customer profiles. The default shipper/customer profiles may include predetermined default shipping preferences to be associated with any shipper/customer having a default shipper/customer profile. In various embodiments, once a shipper/customer is associated with a default shipper/customer profile, the default shipping preferences may be updated at any time after generation of the default shipper/customer profile. As will be described in greater detail herein, each default shipper/customer profile may comprise identifying information used to identify a shipper/customer associated with the default shipper/customer profile, and may additionally comprise one or more default shipping preferences. As a non-limiting example, shipments associated with a default shipper/customer profile may utilize default at risk elements (described in greater detail herein), default delay codes, and/or the like. Moreover, unidentified shipments, or those shipments not associated with a predefined shipper/customer profile may be associated with a default shipper/customer profile and may be shipped according to the default deadlines, milestones, at risk elements, and/or the like stored therein.

As shown in Blocks 501 and 502, the carrier system 100 may receive and store information regarding the identity of the shipper/customer and customer-defined shipping requirements. For example, each shipper/customer profile may comprise information related to the (1) identity of the shipper/customer (e.g., name address, contact information), (2) various subunits within the shipper/customer (e.g., various business groups within the shipper/customer), (3) shipper/customer locations, (4) items associated with each shipper/customer location (e.g., items to be shipped from the shipper/customer), (5) shipper/customer-specific at risk elements (at risk elements will be explained in greater detail herein), (6) times during which a carrier is able to pick up shipments from a shipper/customer location, (7) times during which a carrier is able to drop off shipments at a shipper/customer location, (8) consignee destinations to which the shipper/customer ships items, (9) holiday schedules for each shipper/customer location, (10) shipper/customer-specific delay codes (delay codes are discussed in more detail herein), (11) shipper/customer-specific shipment damage characterizations (e.g., acceptable levels of damage to items during shipping), (12) pricing information, (13) available shipping methods, (14) available shipping methods for each day and time, (15) shipment terms (e.g., contractually agreed upon customer-defined shipping requirements), (16) delivery zones (e.g., areas corresponding to specific delivery requirements, such as required shipping times for each zone), (17) whether specific locations require appointments for carriers to pick up shipments, (18) whether specific locations require appointments for carriers to drop off shipments, (19) Standard Operating Procedures (SOPs) for carriers operating at specific destinations, (20) requested due dates for specific shipments, (21) conversion tables for converting system codes between customer-specific system codes and carrier system codes, (22) maximum time in transit permitted, (23) required temperature ranges of environmental conditions, and/or the like. In various embodiments, a shipper/customer profile may contain additional data regarding shipping lane preferences specified by the customer. For example, a particular customer may require that all shipments originating in Japan and destined for the United States must enter the United States through Los Angeles, Calif. As will be appreciated by one skilled in the art, a carrier may also associate several shipper/customer profiles with a single customer.

In certain embodiments, the shipper/customer profile module may contain default at risk elements. The at risk elements can describe various segments that make up a shipping lane. In various embodiments, the shipping lane is segmented such that the start and end points of a segment defining an at risk element coincide with one or more milestones occurring during the shipping lane. At one or more of the milestones, the shipment location may be documented. As will be understood by one skilled in the art, a customer profile may define at risk elements comprising travel segments that overlap. For instance, a shipping lane may comprise the following milestones: (1) picking up an item from a shipper/customer/consignor, (2) arriving at a service center, (3) departing from the service center, and (4) dropping the item off at a consignee. In this example, the segments defining the corresponding at risk elements may comprise: (1) item pickup to service center arrival (e.g., the amount of time between the item being picked up from the customer and the item arriving at the carrier service center), (2) item pickup to service center departure, (3) item pickup to item drop off, (4) service center arrival to service center departure, (5) service center arrival to item drop off, and/or (6) service center departure to item drop off. The at risk elements may include one or more configurable time deadlines, applicable time periods or time windows, points in time, and/or the like indicating applicable times for completing or accomplishing an at risk element. In various embodiments, the carrier system 100 may be configured to flag a particular shipment as "at risk" if the shipment does not reach a milestone by the applicable time deadline. In various embodiments, these deadlines may be determined based on the initial pickup date and/or time for each shipment. For instance, using the example described above, the pickup to service center arrival at risk element may have a 48-hour deadline that begins upon pickup of the item. Therefore, if an item is picked up from the shipper/customer/consignor at 8:00 AM on Feb. 15, 2014, the corresponding deadline for arriving at the service center would be 7:59 AM on Feb. 17, 2014. In various embodiments, the deadline for each at risk element may be specific for each shipping lane. For example, a shipping lane defining the route from Los Angeles, Calif. to Atlanta, Ga. may have different at risk element deadlines than a shipping lane defining the route from Charlotte, N.C. to Atlanta, Ga. Thus, each shipper/customer profile may comprise different, shipper/customer-specific at risk elements, which may be specific to certain shipping lanes.

In certain embodiments, the carrier system 100 may also define default at risk elements (e.g., received via input from a user computing entity or learned over time) that may be associated with a shipper/customer profile when specific at risk elements are not defined, or that may be associated with a default shipper/customer profile. For instance, illustrative default at risk elements may comprise: (1) item pickup to origin service center departure (e.g., the time between the item being picked up from the shipper/customer/consignor and the item departing from a first carrier service center which may be located near the pickup location), (2) origin service center departure to gateway departure (e.g., the amount of time between the item departing from the first carrier service center and the item departing from a domestic air gateway in the origin country), (3) gateway departure to international gateway departure (e.g., the amount of time between the item departing from a domestic air gateway in the origin country and the item departing from an international air gateway to be shipped internationally), (4) international gateway departure to gateway arrival, (5) appointment delivery confirmed by service center (e.g., the confirmed delivery time as compared against the maximum permitted time in transit), (6) international gateway arrival to gateway arrival (e.g., the amount of time between the item arriving at an international gateway in a second country and the item arriving at the next domestic gateway in the second country), (7) gateway arrival to destination service center (e.g., the amount of time between the item arriving at a domestic air gateway and the item arriving at a carrier service center located in the destination country), (8) destination service center arrival to customs clearance (e.g., the amount of time between the item arriving at the carrier service center in the destination country and the item being cleared by customs in the destination country), (9) customs clearance to out for delivery (e.g., the amount of time between the item being cleared by customs in the destination country and the item going out for delivery on the final delivery vehicle), (10) delivery to proof of delivery (e.g., the amount of time between an item physically being delivered and the system generating a proof of delivery notice), and/or the like. If a particular segment of a shipment, as defined by the at risk elements, exceeds one or more configurable time deadlines, applicable time periods or time windows, points in time, and/or the like indicating applicable times for completing or accomplishing an at risk element, the carrier system 100 will indicate that the requirements of the at risk element were not met and flag the shipment as "at risk." In various embodiments, a carrier system 100 may receive shipper/customer-specific at risk elements and associate each of the received shipper/customer-specific at risk elements with a particular shipper/customer profile.

The carrier system 100 may also receive shipper/customer-specific delay codes to be used to describe the source of shipping delays, and may associate these delay codes with the shipper/customer profile. In various embodiments, each delay code may be associated with a particular description of a cause of delay, or they may be used as stand-alone descriptions of delays. For instance, a particular shipper/customer may request that one or more particular delays be indicated with a preselected 2-3 character delay code (as a non-limiting example, A1 may indicate a delay caused by a missed delivery or AM1 may indicate a delay caused by a shipper missing required documentation). Each shipper/customer profile may comprise one or more preselected delay codes to be used with shipments associated with the shipper/customer profile. The delay codes may take any form, and may comprise a single character or character string, a symbol, a color, and/or the like. As will be understood by one skilled in the art, the carrier system 100 may be configured to automatically select a delay code and associate it with data indicating a delay has occurred during the shipment of an item. Alternatively, the carrier system 100 may be configured to receive user input associating a particular delay code with data indicating a delay has occurred.

As will be understood by one skilled in the art, the carrier system 100 may also include default time deadlines, time periods or time windows, and/or the like indicating applicable times for completing or accomplishing an at risk element. Like the default at risk elements, the default time deadlines may be associated with a default shipper/customer profile, or a shipper/customer profile that does not otherwise define time deadlines for various shipments and/or shipping lanes. Alternatively, the carrier system 100 may be configured to receive (e.g., via a user or shipper/customer operating an appropriate computing entity) customer-specific at risk elements for various shipping lanes. This information may be used to determine whether a particular shipment misses an at risk element deadline. In various embodiments, the carrier system 100 may be configured to end time measurements at one of several points in time in response to an input. For example, the carrier system 100 may be configured to end the time measurements at the time the item arrives at a specified location, at the time the shipper/customer or consignee is notified that the item is present at the specified location, or some other predetermined time in response to a request to hold an item for consignee pickup at the specified location.

In some embodiments, as part of the enrollment/registration process, the carrier system 100 may request biographical and/or geographical information regarding the enrolling shipper/customer (e.g., via the enrollment module). For instance, the carrier system 100 may request (e.g., via a user application, browser, user interface) information such as the shipper's/customer's name, such as a first name, a last name, a company name, an entity name, an organization name, and/or any aliases associated with the customer. For instance, if the shipper/customer were a company named Widgets by ABC, the shipper/customer (e.g., operating an appropriate computing entity) may input ABC's widgets or ABC as aliases. The carrier system 100 may also request (e.g., via a user application, browser, user interface) one or more addresses associated with the shipper/customer (e.g., street address, city, state, postal code, and/or country). For instance, Widgets by ABC's address may be 3957 Main Street, Atlanta, Ga. 30309, USA. As indicated, the shipper/customer may have multiple addresses associated with the profile. For instance, Widgets by ABC may have a home office address and a manufacturing plant address associated with its profile. Similarly, a shipper/customer may have multiple locations (e.g., addresses) associated with his or her profile. When multiple addresses are provided, the shipper/customer (e.g., operating an appropriate computing entity) may input identifying information to be associated with each address. As will be recognized, the shipper/customer may input other biographic and/or geographic information to adapt to various needs and circumstances.

In one embodiment, once the carrier system 100 receives the necessary biographic and/or geographic information from the customer, the carrier system 100 may perform one or more validation operations. For example, the carrier system 100 may determine whether the one or more provided addresses are valid (e.g., by passing the addresses through one or more address cleansing or standardization systems). As will be recognized, a variety of other approaches and techniques can be used to adapt to various needs and circumstances.

In various embodiments, the carrier system 100 may create or update a shipper/customer profile for the shipper/customer via the enrollment/registration process. Accordingly, the carrier system 100 may create and store various shipper/customer profiles (e.g., via the database 240). In addition to at least the information described above, a shipper/customer profile may include one or more corresponding shipper/customer identifiers. As will be understood by one skilled in the art, the carrier system 100 may automatically generate the shipper/customer identifier, or it may receive a manually generated shipper/customer identifier as input. In one embodiment, a shipper/customer identifier may be used to uniquely identify a shipper/customer profile. In another embodiment, a shipper/customer identifier may be used to uniquely identify a given address associated with a shipper/customer profile. In such an embodiment, if a shipper/customer profile is associated with four addresses, the carrier system 100 may create and store four shipper/customer identifiers in association with the shipper/customer profile. The shipper/customer identifier may also be stored in association with shipping data for an item to associate the item (and its shipping data) with the (a) correct shipper/customer (e.g., shipper/customer profile) and/or (b) correct address for a shipper/customer.

Once a shipper/customer profile has been generated by the carrier system 100, the carrier system 100 may permit the shipper/customer profile to be edited, updated, and/or modified. For instance, if the agreement between the carrier and the shipper/customer changes, the shipper/customer profile may be updated to reflect the changes in the agreement.

Referring back to FIG. 5, at Block 503, the carrier system 100 receives shipping data associated with one or more shipments. As will be described in greater detail herein, the carrier system 100 may utilize the shipping data associated with the shipment to identify a shipper/customer associated with the shipping data at Block 504. At Block 505, once the carrier system 100 has identified the appropriate shipper/customer profile, the carrier system 100 identifies applicable customer-defined shipping requirements for the shipment.

User Enrollment

In certain embodiments, the carrier system 100 may only provide specific carrier personnel with access to information regarding items associated with a particular shipper/customer profile. To limit access to the designated carrier personnel, the carrier system 100 may require enrollment/registration of users (e.g., carrier personnel) prior to providing access to all or select information from the carrier system 100. In certain embodiments, as indicated in Block 600 of FIG. 6, the process may include the enrollment/registration of carrier personnel as users of the carrier system 100. To enroll a new user, the carrier system 100 may receive user data comprising identifying information about the new user, as shown in Block 601. For example, in certain embodiments, the carrier system 100 may receive information regarding the new user's: (1) name, (2) contact information (e.g., an email address or phone number), (3) associated business unit, (4) location, (5) title, (6) direct supervisor (e.g., the name and contact information for the new user's direct supervisor), (7) level of access requested, (8) role, and (9) associated customer profiles. In certain embodiments, the carrier system 100 also permits modification or cancellation of existing user profiles.

In certain embodiments, each user profile is associated with a user identifier and a security access identifier, such as a username and password. The user identifier and security access identifier may serve to limit access to information stored by the carrier system 100 to those who have enrolled with the carrier system 100. As will be understood by one skilled in the art, the carrier system 100 may automatically generate a user identifier or receive a user identifier as input. Similarly, the carrier system 100 may receive a security access identifier as input in the form of a character string, fingerprint scan, retinal scan, or other identification verification methods, or it may automatically generate the security access identifier.

In some embodiments, once the carrier system 100 receives the necessary biographic and/or geographic information from the new user, the carrier system 100 may perform one or more validation operations as shown at Block 602. For example, the carrier system 100 may determine whether the user identifier provided by the user is identical to a user identifier associated with another, preexisting user of the carrier system 100. In certain embodiments, the carrier system 100 may compare the provided new user information against a company directory to determine whether the new user is an active employee of the carrier. As will be recognized, a variety of other approaches, techniques, and verification steps can be used to adapt to various needs and circumstances.

A user profile may correspond to one or more shipper/customer profiles. For instance, as shown at Block 603 the carrier system 100 may restrict access to customer profiles to a limited number of users, or only to certain specified users. In these embodiments, users are only able to view shipments associated with the customer profiles to which they are provided access or assigned. In certain embodiments, the level of access provided or assigned to a user may determine the number of shipper/customer profiles viewable by the user. For instance, the carrier system 100 may assign a level of access to each profile selected from the following: (1) Control Tower, (2) Program Management, (3) Solutions, (4) Information Technology (IT), (5) Industrial Engineering (IE), (6) Product, and (7) Business Development. In certain embodiments, the carrier system 100 may provide Control Tower users access to shipments associated with several shipper/customer profiles. Program Management and Product users may have access to shipments associated with a single shipper/customer profile. Solutions, IT, IE, and Business Development users may have access to all shipments associated with all shipper/customer profiles. As will be understood by one skilled in the art, alternative levels of access can be utilized, and the actual shipping data available to users with various levels of access may differ from that described above.

The carrier system 100 may also utilize the user identifier to determine which user makes changes to the information stored by the carrier system 100. In certain embodiments, the carrier system 100 may be configured to determine and store information regarding which user makes changes to information stored by the carrier system 100.

Customer and Item Matching

In one embodiment, once a shipper/customer profile has been created by the carrier system 100 as illustrated in FIG. 5 and represented by Block 701 in FIG. 7, one or more items to be shipped by or to a customer by the carrier may need to be identified upon induction into the carrier's transportation and logistics network. By identifying items to be shipped by or to the customer, the carrier system 100 can track each shipment of one or more items to ensure that it is in compliance with the customer-defined shipping requirements. As will be recognized, an item or a shipment may be a parcel or group of parcels, a package or group of packages, scrap metal banded together, a vehicle part, a box, a crate, a drum, a box strapped to a pallet, and/or the like. As shown as Block 702, the carrier system 100 may receive shipping data regarding the shipment containing one or more items from a pre-shipment manifest, for example, provided by a customer or other shipment identifier. In one embodiment, each item may include an item/shipment identifier, such as an alphanumeric identifier. Such item/shipment identifiers may be represented as text, barcodes, tags, character strings, Aztec Codes, MaxiCodes, Data Matrices, Quick Response (QR) Codes, electronic representations, and/or the like. The unique item/shipment identifier (e.g., 1Z298179) may be used by the carrier to identify and track the item as it moves through the carrier's transportation network. Further, such item/shipment identifiers can be affixed to items by, for example, using a sticker (e.g., label) with the unique item/shipment identifier printed thereon (in human and/or machine readable form) or an RFID tag with the unique item/shipment identifier stored therein. In certain embodiments, a person can manually enter item/shipment identifiers into the carrier system 100 using a user computing entity 110. In other embodiments, item/shipment identifiers affixed to items can be automatically read by interrogators, readers, computing entities, and/or the like.

In one embodiment, the carrier system 100 may store an item/shipment identifier in association with shipping data for the item. The shipping data may include information about the item, such as the shipping method or shipping sequence (e.g., the sequence of steps involved in moving an item from an origin to a destination according to a shipping lane). The shipping data may include information about the party shipping the item (e.g., shipper/consignor), such as the party's address, the party's phone number, the party's return address, the party's name, and/or the like. The shipping data may also include information about the customer to whom the item is to be delivered (e.g., recipient/consignee), such as the customer's address (e.g., delivery location), the customer's phone number, the customer's name, and/or the like.

In one embodiment, the shipping data may include information about the item being transported and any tracking information. The tracking information may reflect the item's movement in a carrier's transportation and logistics network, including expected delivery date and time. To reflect the item's movement, an item/shipment identifier associated with the item or shipment may be entered into a computing entity/device manually, by scanning an identifier, or otherwise electronically reading an identifier at various points as the item is transported through a carrier's transportation and logistics network. For example, the item/shipment identifier may be manually typed into a computer system, or automatically scanned by a barcode or MaxiCode device, an RFID interrogator, by a camera controller, or by a carrier employee using a user computing entity 110. In one embodiment, each time the item/shipment identifier is entered, scanned, or read, an appropriate entity/device can transmit the item/shipment identifier and other appropriate information (e.g., location and time of the scan or reading) to the carrier system 100. The carrier system 100 can then receive and use the information to track the item as it is transported though a carrier's transportation and logistics network and update the shipping data accordingly.

In one embodiment, the carrier system 100 may use the shipping data to identify one or more shipper/customer profiles corresponding to the item (e.g., via the shipment tracking module). As described, each shipper/customer profile may include one or more addresses associated with the customer. Thus, when the carrier system 100 receives shipping data (or a portion of shipping data) for an item (Block 702 of FIG. 7), the carrier system 100 can determine whether the item corresponds to any customers enrolled/registered for a customer profile. For example, the carrier system 100 may receive shipping data contained on a pre-shipment manifest and may utilize the received shipping data to determine whether the shipping data corresponds to information contained in any shipper/customer profiles (e.g., matching the address from the shipping data to one or more profiles). If the carrier system 100 identifies a match between the entered shipping data and the data contained in the shipper/customer profiles, the carrier system 100 may associate the shipment with the identified shipper/customer profile.

Referring again to FIG. 7, after identifying the appropriate customer profile, the carrier system 100 can associate the shipping data for the item with the customer profile (Block 704). At Block 705, the carrier system 100 may determine the appropriate customer-defined shipping requirements for a shipment based on the information provided in the customer profile. For example, the carrier system 100 may identify the appropriate shipping lanes for moving the shipment from its origin to its destination. The identified shipping lane may comprise one or more milestones dividing the shipping lane into one or more segments (e.g., at risk elements). As described above, the carrier system 100 may be configured to determine appropriate deadlines for reaching each milestone. Thus, the carrier system 100 is then able to compare the current progress of a shipment as it receives information regarding the current status of the shipment against the estimated or required progress in order to arrive at its final destination in compliance with the customer-defined shipping requirements. If the carrier system 100 determines that a shipment is scheduled to arrive at its destination after an assigned deadline, the carrier system 100 may be configured to flag the shipment as "at risk."

As will be described in greater detail below, the carrier system 100 may determine whether the shipment is subject to any non-time related shipping risks at Block 706 prior to tracking the shipment progress. If the shipment is subject to non-time related shipping risks, the carrier system 100 may designate the shipment as "at risk" at Block 707. For example, if a particular shipment is temperature sensitive or destined to a specified country, the carrier system 100 may be configured to flag the shipment as "at risk." In various embodiments, the carrier system 100 may be configured to prevent removal of the "at risk" designation if such designation is based on a non-time related shipping risk. However, as will be understood by one skilled in the art, the carrier system 100 may be configured to allow removal of the "at risk" determination in response to various events or user inputs.

The carrier system 100 may also be configured to schedule the delivery for several shipments destined for a common destination such that the shipments are delivered simultaneously. For example, several shipments destined for a common recipient may be delivered together using a single delivery vehicle. For consignees requiring delivery appointments, the carrier system 100 may schedule multiple shipments to utilize a single delivery appointment. In various embodiments, the system may identify multiple shipments destined for a common consignee destination and scheduled to be delivered within a particular time frame and may schedule the identified multiple shipments for a single final delivery. As will be understood by one skilled in the art, the various shipments combined into a single delivery need not originate from a single consignor, but may originate at various locations operated by various consignors.

In various embodiments, the carrier system 100 may be configured to identify shipments that do not correspond to a particular customer profile. For example, the carrier system 100 may be configured to determine whether a shipper, recipient/consignor, and/or payer associated with a particular shipment is associated with a shipper/customer profile stored by the carrier system 100. If the carrier system 100 cannot identify a matching customer profile by comparing the identity of the parties or other shipping data with the customer profile data stored by the carrier system 100, the carrier system 100 may designate the shipment as "unassigned." Shipments designated as "unassigned" are not associated with a shipper/customer profile, and may be identified based on their "unassigned" designation. In various embodiments, all users may have access to data associated with shipments designated as unassigned. Alternatively, only a subset of the total users, may have access to shipments designated as unassigned. The carrier system 100 may be configured to allow users to manually associate shipments designated as "unassigned" with various customer profiles. Alternatively, the carrier system 100 may be configured to allow users to dissociate a particular shipment from a shipment/customer profile. In various embodiments, the carrier system 100 may be configured to receive a description of the reason for dissociating the item from the shipper/customer profile. For example, the carrier system 100 may be configured to receive a description stating that the shipment was incorrectly associated with a particular shipper/customer profile.

Item Tracking

Referring again to FIG. 7, the carrier system 100 may be configured to generate a user profile at Block 707. The carrier system 100 may additionally be configured to associate a particular shipment with one or more user profiles at Block 708. The carrier system 100 may be configured to associate particular shipments with particular users (e.g., carrier personnel) based on various characteristics of the shipment, such as, for example, the shipper/customer profile associated with the shipment. The carrier system 100 may be configured to grant specified users access to view shipments associated with a particular shipper/customer profile. Each user profile may therefore be associated with one or more shipper/customer profile such that the user may only retrieve information regarding shipments related to the one or more shipper/customer profiles with which the user profile is associated via a user computing entity 110. At Block 709, the carrier system 100 may be configured to cause display of information related to the one or more shipments associated with a particular user profile using a user computing entity 110.

The carrier system 100 may rely on timing information to determine when a shipment reaches a milestone during the shipping process. As mentioned above, a milestone may correspond to a particular event or occurrence in which an item reaches a determinable location during shipment. For instance, in certain embodiments, the carrier system 100 may indicate the following events and occurrences as milestones: (1) pickup date (the date the carrier takes possession of the item from the consignor), (2) contracted delivery due date (the delivery due date for the item determined by shipping route, shipping level of service, and geographic region), (3) customer required delivery date (the required delivery date for the item determined based on information included in the customer profile), (4) export customs cleared (the date and time the carrier receives a release from the origin country government to export the item), (5) origin service center departure (the date and time the item is confirmed on board the master bill for a surface or air vehicle at the origin tariff point), (6) gateway departure (the date and time the item is confirmed on board an air vehicle for the first air movement), (7) international gateway departure (the date and time the item is confirmed on board an air vehicle for the first international air segment of the shipment), (8) destination gateway arrival (the date and time the item arrives in its final destination country), (9) international gateway arrival (the date and time the item arrives at the first port of entry that contains a destination tariff point), (10) arrival at destination service center (the date and time the item arrives at the destination tariff point), (11) time broker notified (the date and time the importer of record of the item is notified of the item's arrival at the destination tariff point), (12) time carrier requested appointment from the customer (the date and time the carrier requests a delivery appointment at the destination), (13) time customer gives carrier for appointment (the original scheduled appointment time given for delivering the item to the final destination), (14) revised time customer gives to carrier for appointment (the most recently updated scheduled appointment time given for delivering the item to the final destination), (15) appointment delivery (the date the customer has asked for delivering the item to the final destination), (16) booking confirmation (the date and time of the first confirmed delivery appointment in the carrier system 100), (17) time customer notified (the date and time the customer is notified of the arrival of the item), (18) customs cleared (the date and time the item clears importation customs in the destination country), (19) partial out for delivery (the date and time at least a portion of the items contained in a shipment go out for delivery to the final destination), (20) out for delivery (the date and time the shipment goes out for delivery), (21) partial delivery (the date and time a portion of the items contained in a shipment are delivered to the final destination), (22) delivery (the date and time the shipment is delivered to the final destination), (23) proof of delivery (the date, time, and name associated with the signed document showing the consignor received the items in the shipment), and/or the like. At block 710 of FIG. 7, the carrier system 100 may receive this information from carrier employees working with the physical items included in the various shipments. Those carrier employees may input the time and location information into various user computing entities 110 in communication with the carrier system 100. Alternatively, the carrier system 100 may be in communication with or comprise a location data system configured to receive and compile location information for one or more shipments, and the carrier system 100 may receive the location information from the location data system. In various embodiments, the carrier system 100 assigns deadlines for at least a portion of the milestones associated with a particular shipment based on information provided in the shipper/customer profile.

In various embodiments, the carrier system 100 may be configured to receive real-time (e.g., current) location data for items located on a transporter (e.g., a vehicle 105 or aircraft 106). In certain embodiments, the location data may comprise the current location of the transporter that is transporting the item and the transporter identifier for the respective transporter. The transporter identifier may comprise a unique identifier associated with each transporter, such as an alphanumeric identifier. Such transporter identifiers may be represented as text, barcodes, tags, character strings, Aztec Codes, MaxiCodes, Data Matrices, Quick Response (QR) Codes, electronic representations, and/or the like. The unique transporter identifier (e.g., 123456789) may be used by the carrier to identify and track the transporter's movements. As will be understood by one skilled in the art, the carrier system 100 may be configured to automatically generate a transporter identifier for one or more transporters. However, the transporter identifiers may, in certain embodiments, be generated either automatically or manually by other entities. The carrier system 100 may also be configured to determine scheduled or estimated location data based on the shipping data. As described above, the carrier system 100 may receive the real-time (e.g., current) location data from data collection devices 130 associated with each transporter (e.g., vehicle 105 or aircraft 106). The carrier system 100 may be configured to compare the real-time (e.g., current) location of an item against its scheduled or estimated location to determine whether the item is likely to reach its next milestone prior to the scheduled deadline. For example, the carrier system 100 can track an aircraft 106 (or other transporter) containing items in one or more shipments. The carrier system 100 can compare a scheduled time of arrival for the aircraft 106 against an estimated time of arrival based at least in part on the real-time location information of the aircraft 106. If the aircraft 106 is estimated to arrive after the scheduled arrival time, the carrier system 100 may be configured to determine that items contained on the aircraft 106 are no longer on schedule (e.g., they are at risk). As will be understood by one skilled in the art, the estimated time of arrival may be determined based at least in part on the real-time location information of the aircraft, the current speed of the aircraft, the distance remaining between the current location of the aircraft and the destination of the aircraft, and/or the like.

Figure 8:
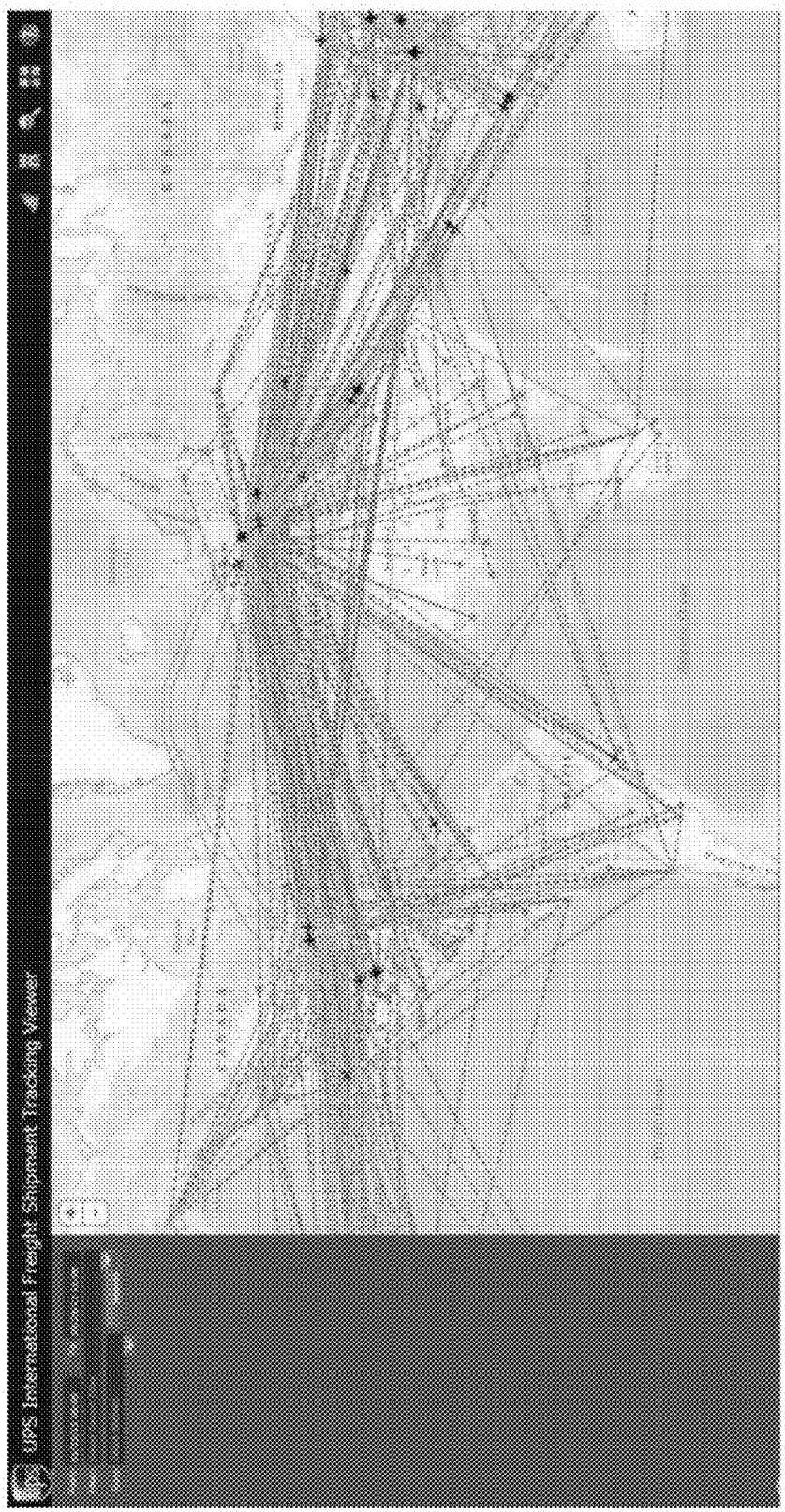
FIGS. 8-22 illustrate exemplary input and output in accordance with various embodiments of the present invention.
Figure 9:
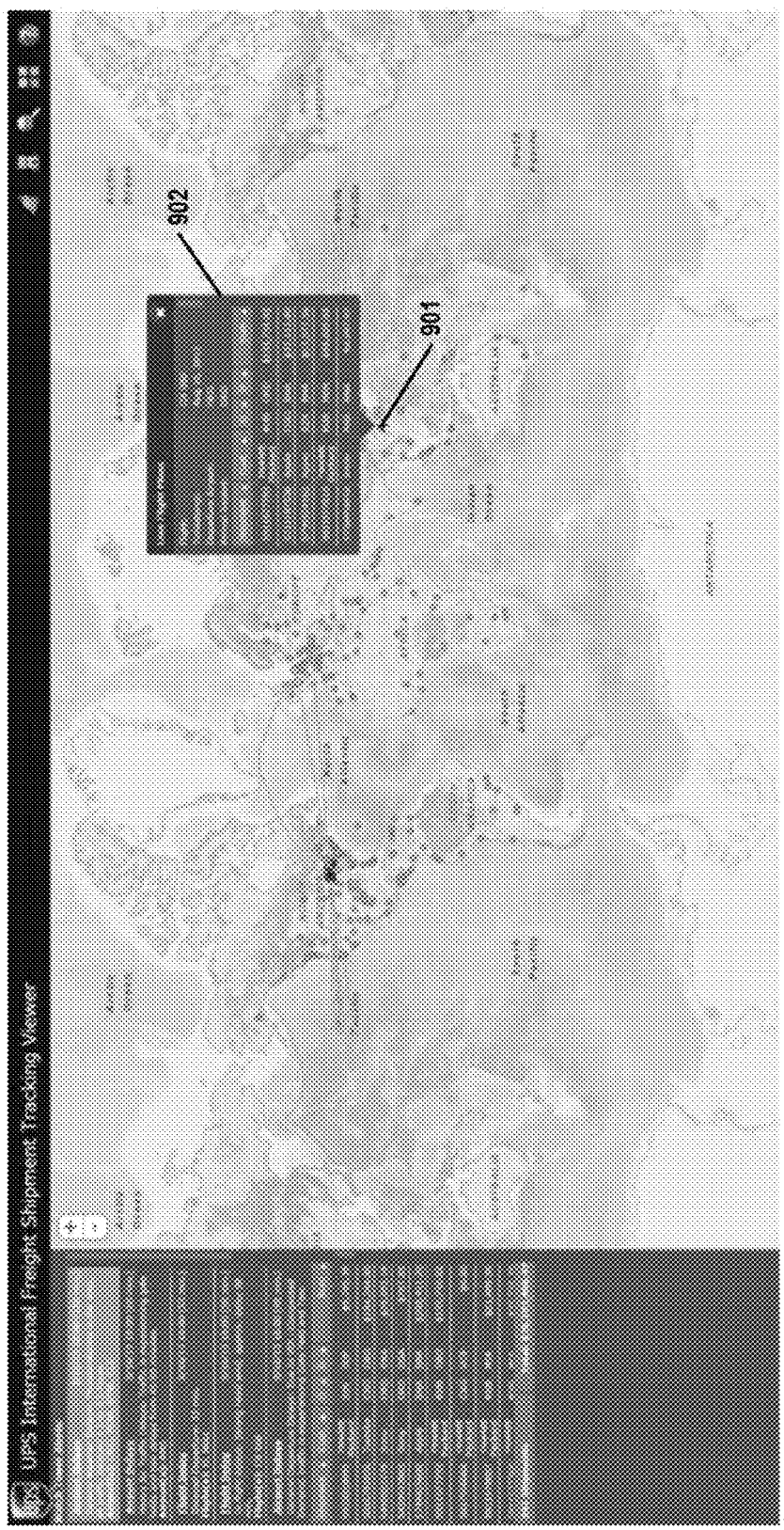

As shown in FIG. 8, the carrier system 100 may be configured to cause display of the location of various transporters (e.g., vehicles 105 or aircraft 106) containing shipments via a transporter indicator representing the location each transporter on a geographical map. Although FIG. 8 only displays tracked aircraft 106, it should be understood that the carrier system 100 may be configured to track and display the location of surface and water vehicles, such as trucks, tractor-trailers, ships, barges, boats, hovercrafts, and/or the like. The carrier system 100 may be configured to cause display of information regarding the shipments currently located on a transporter (e.g., vehicle 105 or aircraft 106). As shown in the illustrated embodiment of FIG. 9, this information may be presented in a displayed box 902 located near the respective transporter indicator 901. In various embodiments, the carrier system 100 may be further configured to indicate whether a particular transporter is transporting one or more at risk shipments (e.g., a shipment flagged as "at risk") by differentiating the respective transporter indicator (e.g., the transporter indicator representing the transporter that is transporting an at risk shipment) from other transporter indicators. In various embodiments, the carrier system 100 may be configured to differentiate transporter indicators associated with transporters that are transporting at risk shipments by causing display of these transporter indicators in a color different from other transporter indicators, by causing these transporter indicators to flash, by causing these transporter indicators to appear larger than others, by causing display of a symbol or text near or on the transporter indicator, and/or the like. As a non-limiting example, the carrier system 100 may be configured to display the transporter indicator associated with an aircraft transporting an at risk shipment using bold red text, while displaying the remaining transporter indicators using black text.

Figure 10:
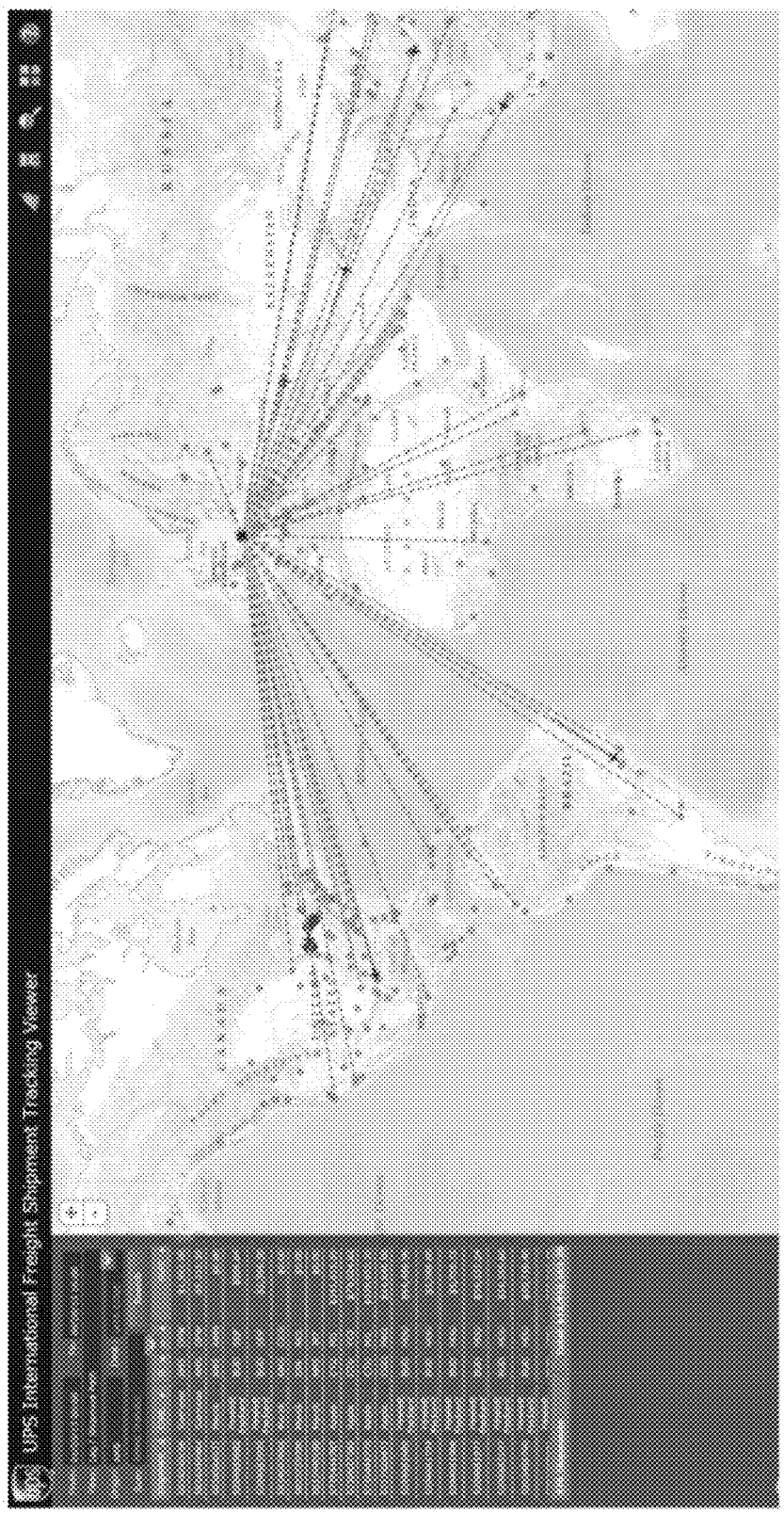
Figure 11:
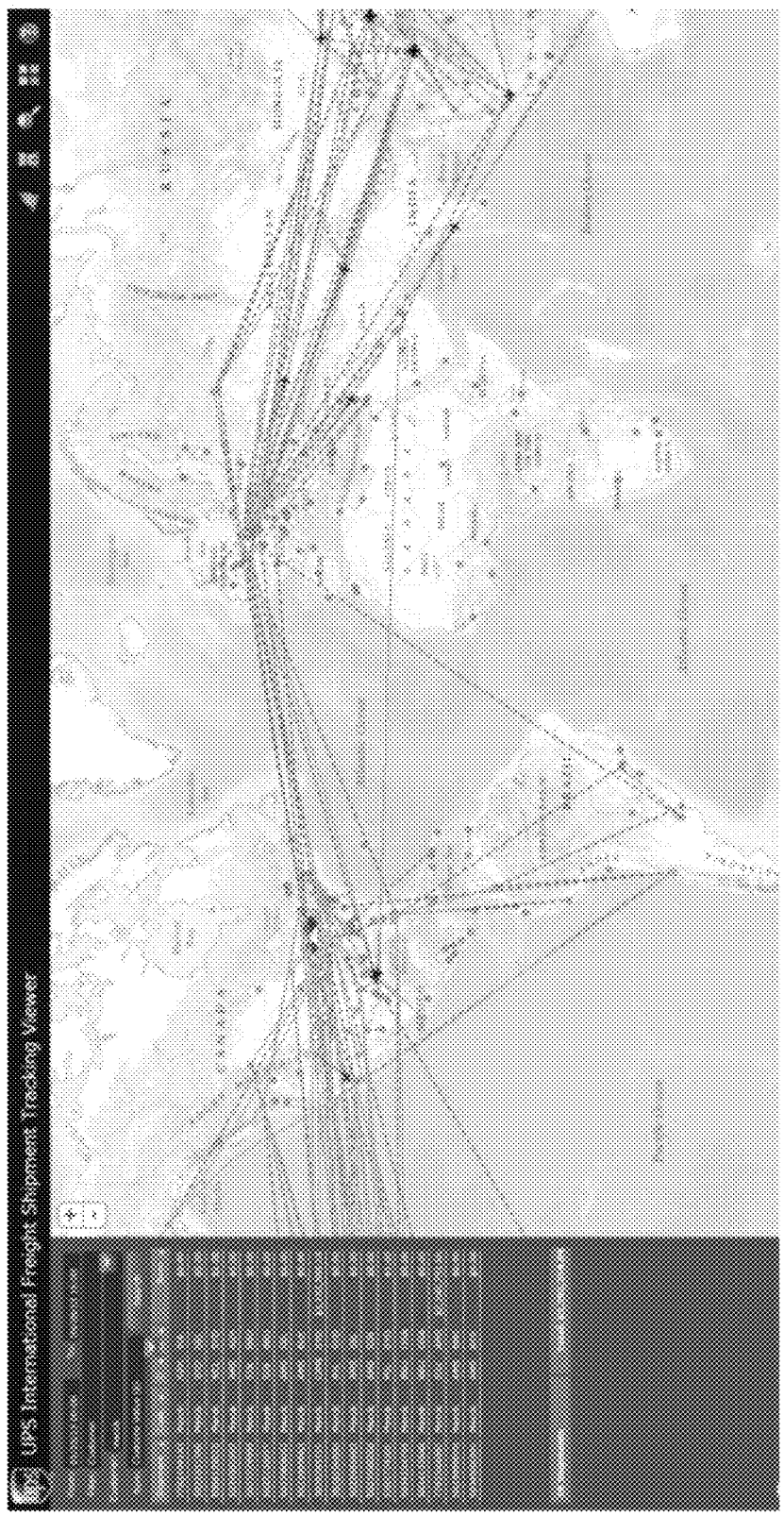
Figure 12:
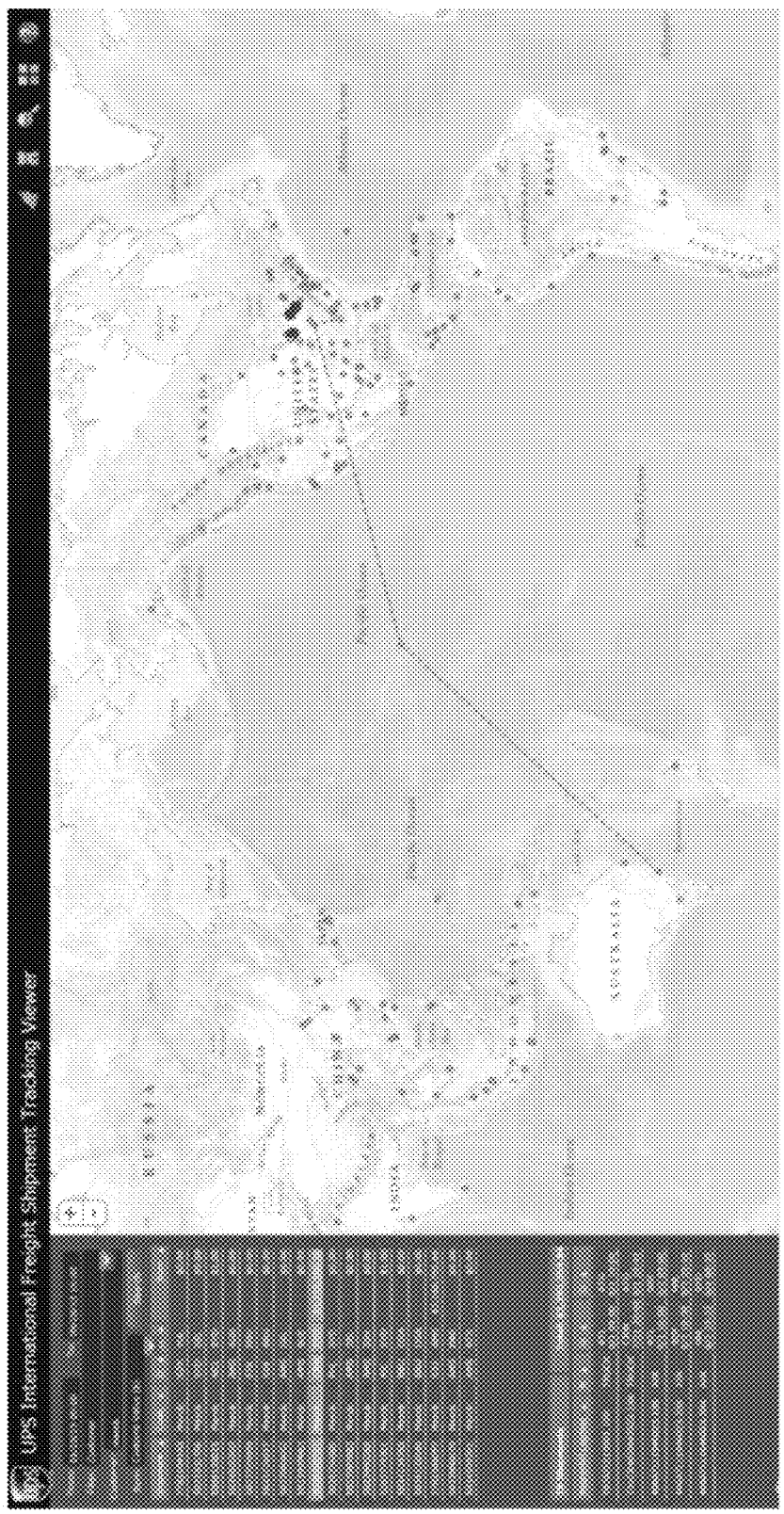
Figure 13:
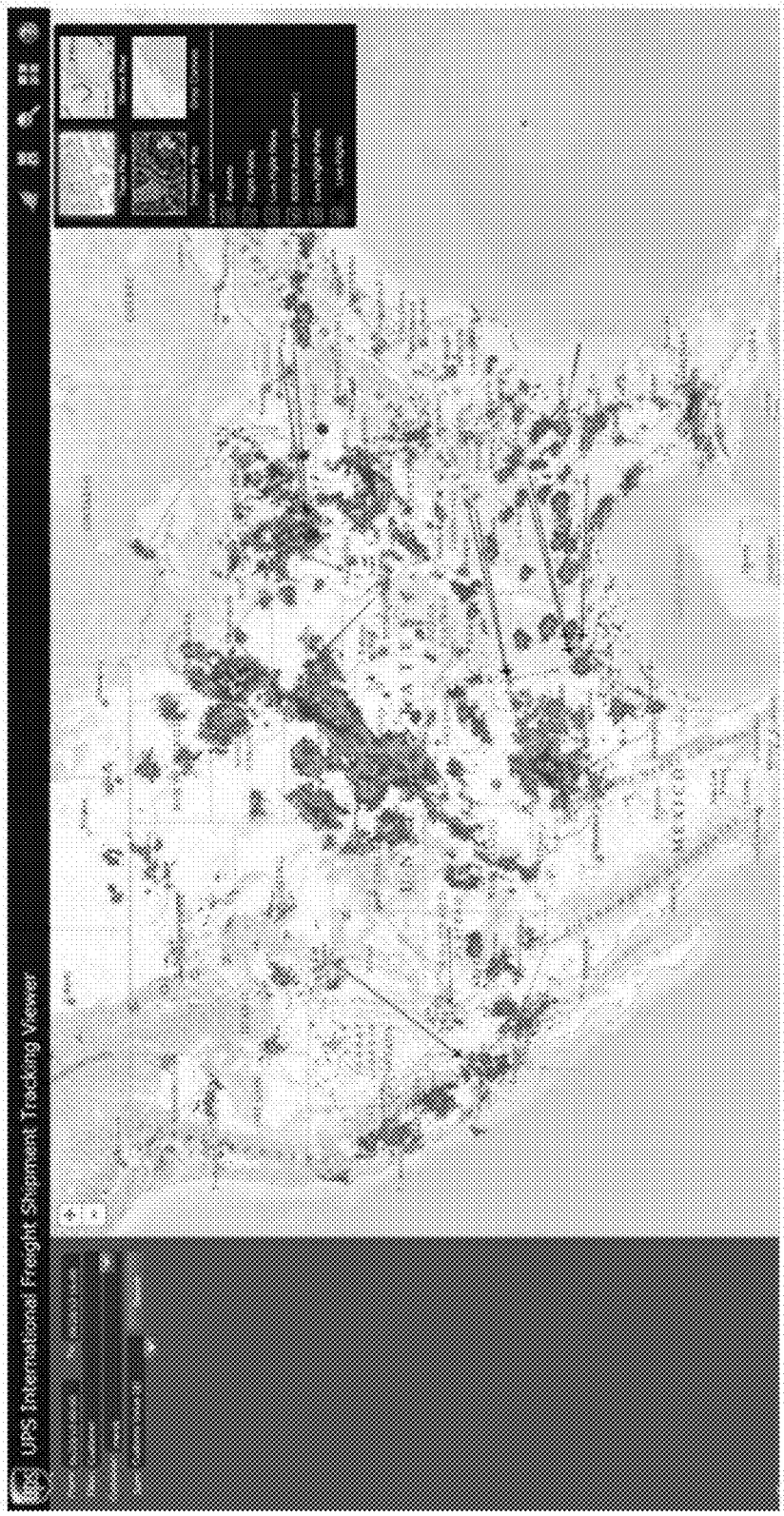
Figure 14:
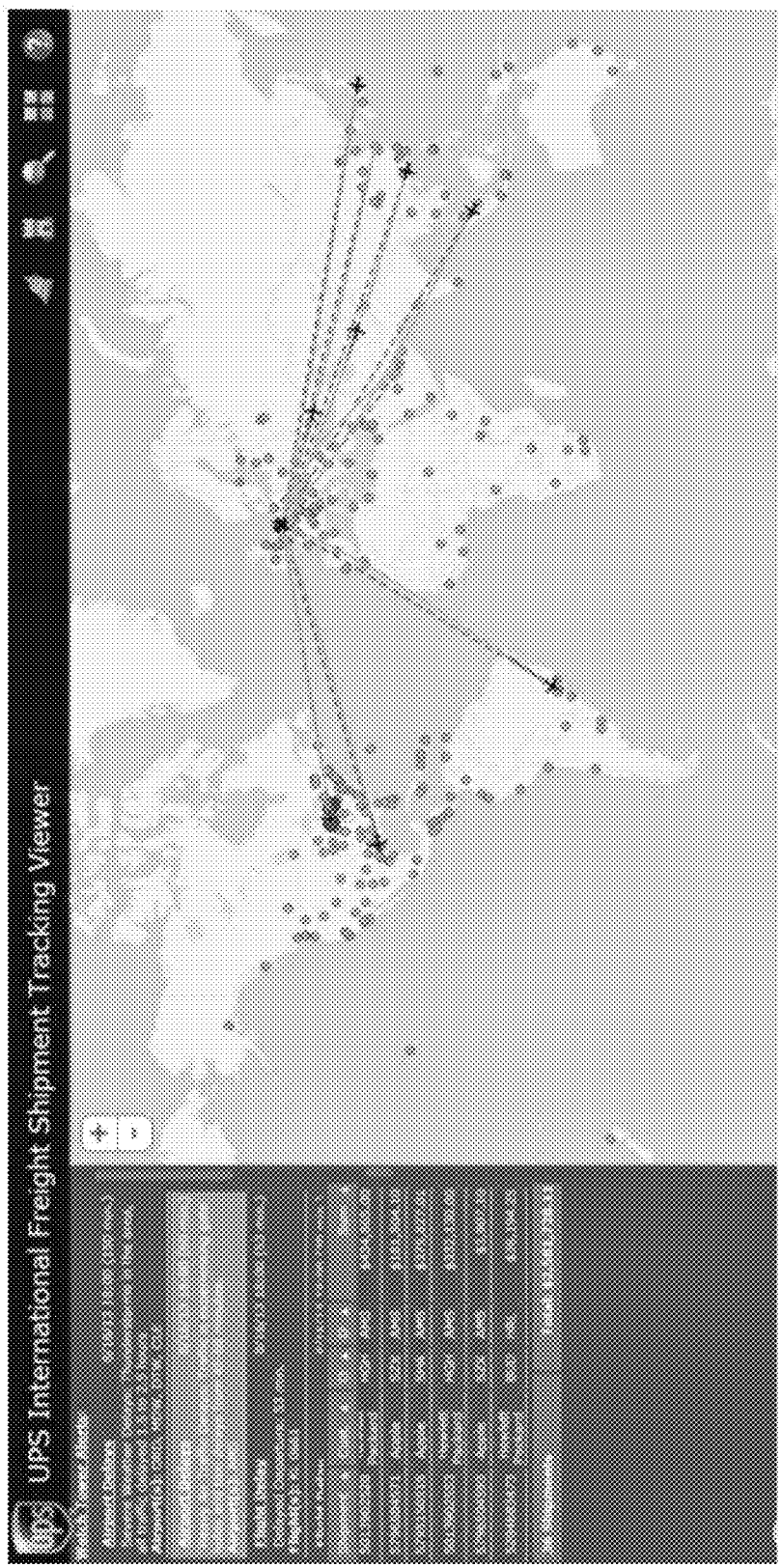

FIGS. 10-12 show various options for sorting displayed data. As shown in FIGS. 10-12, the carrier system 100 may be configured to cause display of transporter indicators representing only a portion of the transporters containing shipments. The carrier system 100 may be configured to show data pertaining to shipments moving from a specified origin or to a specified destination, shipments associated with a specified customer, or a single shipment. As shown in FIG. 13, the carrier system 100 may be configured to receive weather information for at least a portion of the world, and overlay the received weather information onto the displayed map. The weather information may be received from, for instance, one or more data collection devices 130 associated with one or more transporters (e.g., vehicles 105 or aircraft 106), or the weather information may be received from an external source. In various embodiments, the carrier system 100 may be configured to receive and display airport status information as shown in FIG. 14. As will be understood by one skilled in the art, the airport status information may indicate whether aircraft departing from, or arriving at a particular airport are delayed. The airport status information may comprise detailed information regarding the estimated length of delay, the cause of delay, and/or the like. As will be understood by one skilled in the art, the airport status information and weather information may be displayed on a single map (as illustrated in FIG. 13). In various embodiments, an indicator such as a symbol, letter, code, character string and/or the like on a map may be utilized to indicate the status of a particular airport. As non-limiting examples, a color-coded symbol placed near the location of a particular airport on a map may be used to indicate the status of the represented airport. For example, a green symbol may be used to indicate an airport operating on schedule (e.g., no delays for aircraft departing from or arriving at the represented airport) and a red symbol may be used to indicate an airport operating behind schedule (e.g., aircraft departing from and/or arriving at the represented airport are experiencing delays). As will be understood by one skilled in the art, a variety of indicators may be used to indicate the status of an airport. As additional non-limiting examples, the size of a symbol may be representative of the average length of delay experienced by aircraft departing from or arriving at a given airport, or various shapes may be utilized to indicate the current status of a particular airport.

The carrier system 100 may be configured to receive tracking information regarding shipments even when those shipments are being moved by third party entities not associated with the carrier. For example, if an item is being transported by a third-party freight airline, the carrier system 100 may still receive real-time (e.g., current) location information regarding the location of the aircraft 106 containing the one or more items. As described above, the system may also determine whether a particular item is likely to arrive at a milestone prior to the determined deadline, even when those shipments are being moved by third-party entities. As described above, the carrier system 100 may utilize the received real-time (e.g., current) location data of a third-party transporter (e.g., vehicle 105 or aircraft 106) and the determined milestone deadline to determine whether the item is likely to arrive at the milestone prior to the deadline. If the item is behind schedule or otherwise likely to arrive after the expiration of the milestone deadline, the carrier system 100 may be configured to flag the shipment comprising the item as "at risk."

In one embodiment, by updating the item location data as the item moves through a carrier's transportation and logistics network and reaches various milestones, a user (e.g., operating a user computing entity 110) can view the item's progress, and the user or the carrier system 100 can determine whether the item remains on schedule for a delivery in compliance with the customer-defined shipping requirements associated with the item. At decision block 711, the carrier system 100 may determine that a particular shipment is not on schedule if the shipment does not reach a particular milestone by the assigned deadline. Moreover, if a transporter (e.g., vehicle 105 or aircraft 106) containing items is estimated to arrive at a destination after a scheduled arrival time, the carrier system 100 may determine that the items on the transporter are no longer on schedule and may flag the shipments comprising the items as "at risk." In various embodiments, the carrier system 100 may be configured to indicate those shipments that are not on schedule to be "at risk" shipments at Block 712 of FIG. 7.

In various embodiments, the carrier system 100 may be configured to receive an input defining a configurable threshold for flagging a shipment as "at risk." Such configurable thresholds may comprise an upper and/or lower limit for particular measurable characteristics for a particular shipment and/or item. For example, the configurable thresholds may define a safe temperature range for a temperature sensitive item (e.g., an upper and/or lower temperature limit). If the temperature of the item rises above or drops below the safe temperature range, the carrier system 100 may be configured to flag the shipment containing the item as "at risk." As will be understood by one skilled in the art, the safe temperature range may be smaller than the contractually-required temperature range for the particular item such that a shipment may be flagged as "at risk" prior to the shipment becoming non-compliant with the contractual temperature requirements. In various embodiments, the safe temperature range may comprise a set maximum value and/or a set minimum value, or alternatively it may be set relative to the contractually required temperature value. For example, the safe temperature range may be set to 5 degrees above any contractually required minimum temperature and/or 5 degrees below any contractually required maximum temperature.

The configurable thresholds may additionally comprise a safe milestone deadline for a shipment to reach an assigned milestone. As will be understood by one skilled in the art, the safe milestone deadline may occur prior to the defined milestone deadline such that, if a shipment does not reach a milestone before the expiration of the safe milestone deadline, the carrier system 100 may be configured to flag the shipment as "at risk." In various embodiments, the safe milestone deadline may comprise a defined time, or it may be defined relative to a milestone deadline. As a non-limiting example, a shipment may not be considered behind schedule if it arrives at an assigned milestone after the expiration of the safe milestone deadline but before the expiration of the defined milestone deadline, but the carrier system 100 may be configured to flag shipments arriving after a safe milestone deadline as "at risk" so as to facilitate the monitoring of shipments nearing an assigned milestone deadline. For example, a safe milestone deadline may expire 6 hours prior to a milestone deadline. In another embodiment, the configurable thresholds may comprise a predetermined amount of time of a particular event occurring. As an example, the carrier system 100 may indicate a shipment as "at risk" if the cooling system on the shipment's container will lose power within 6 hours of the current time.

As will be understood by one skilled in the art, the carrier system 100 may receive an input defining the configurable threshold, and the configurable threshold may be the same among all shipments, or it may be defined individually in each shipper/customer profile. As will be explained in greater detail below, the carrier system 100 may be additionally configured to remove an "at risk" flag from a shipment if shipment the shipment is later determined to be on schedule or within an acceptable range at Block 713. In various embodiments, the carrier system 100 may permit a user (e.g., operating a user computing entity 110) to remove an "at risk" flag manually. For example, if a shipment arrives at an assigned milestone after the configurable threshold, but before the defined milestone deadline, the carrier system 100 may be configured to automatically remove the "at risk" flag upon the shipment arriving at the milestone. Alternatively, the carrier system 100 may be configured to receive input removing the "at risk" flag from a user upon a determination that a shipment arrived at the milestone deadline prior to the expiration of the defined milestone deadline. At Blocks 714 and 715, if the carrier system 100 determines that the shipment has not arrived at its final destination, the carrier system 100 repeats steps 710-713 when additional shipment location information becomes available.

Figure 15:
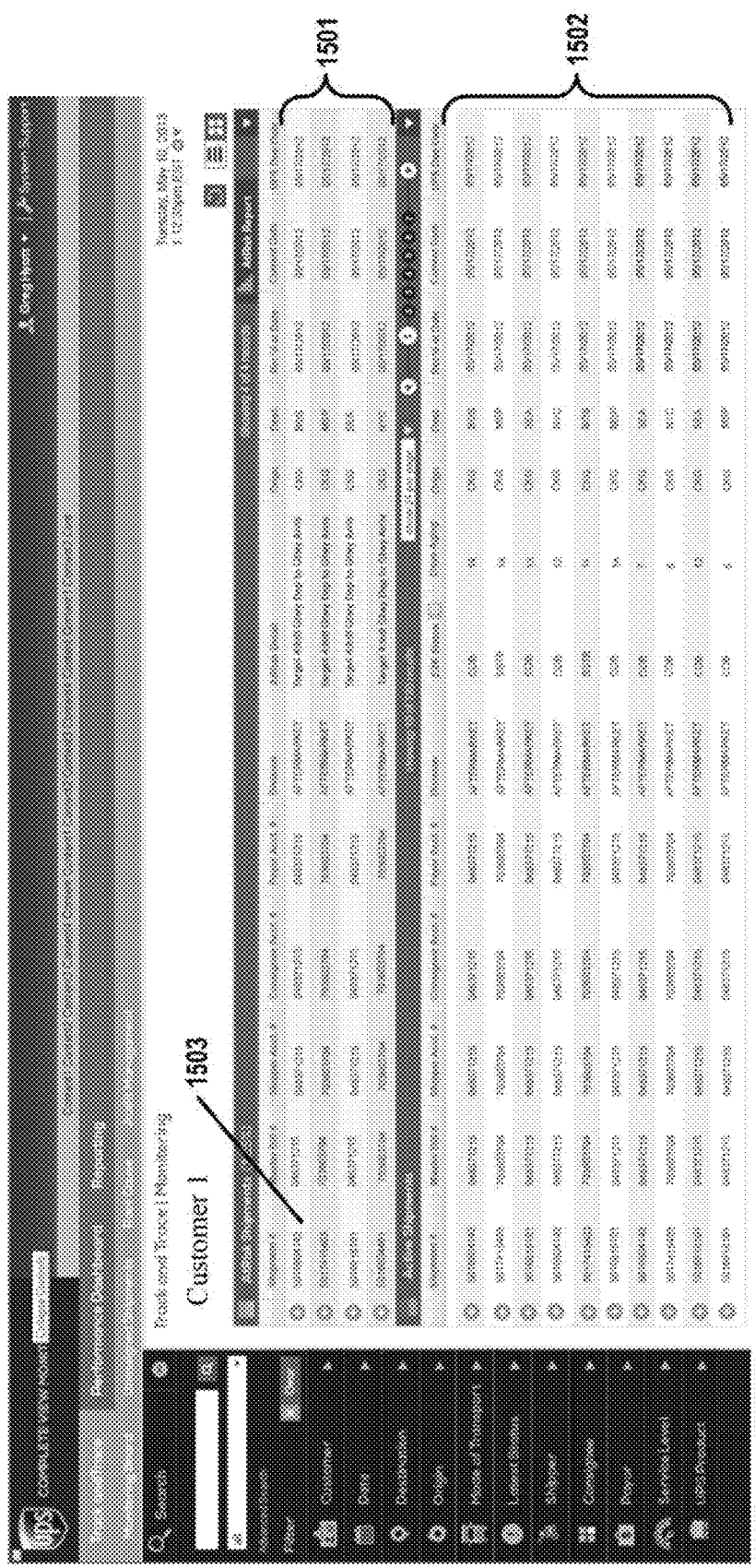
Figure 16:
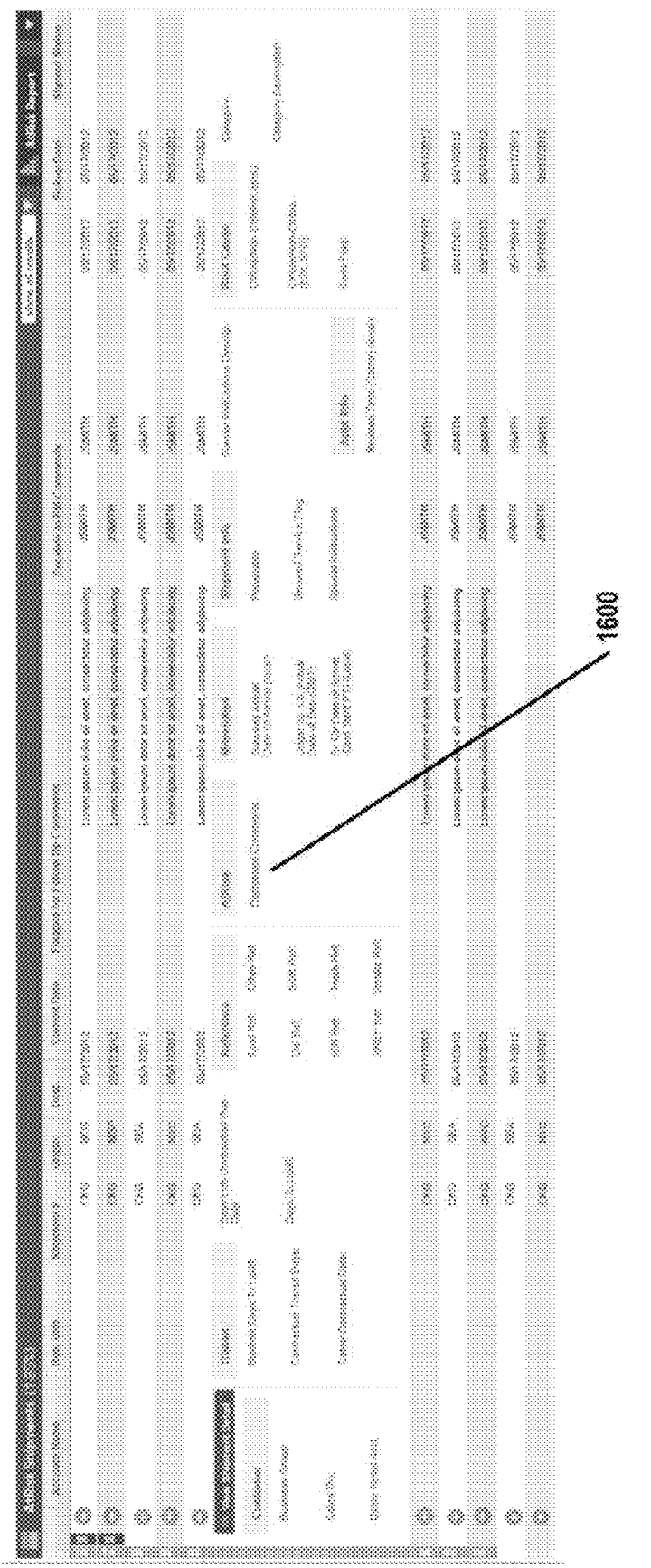
Figure 17:
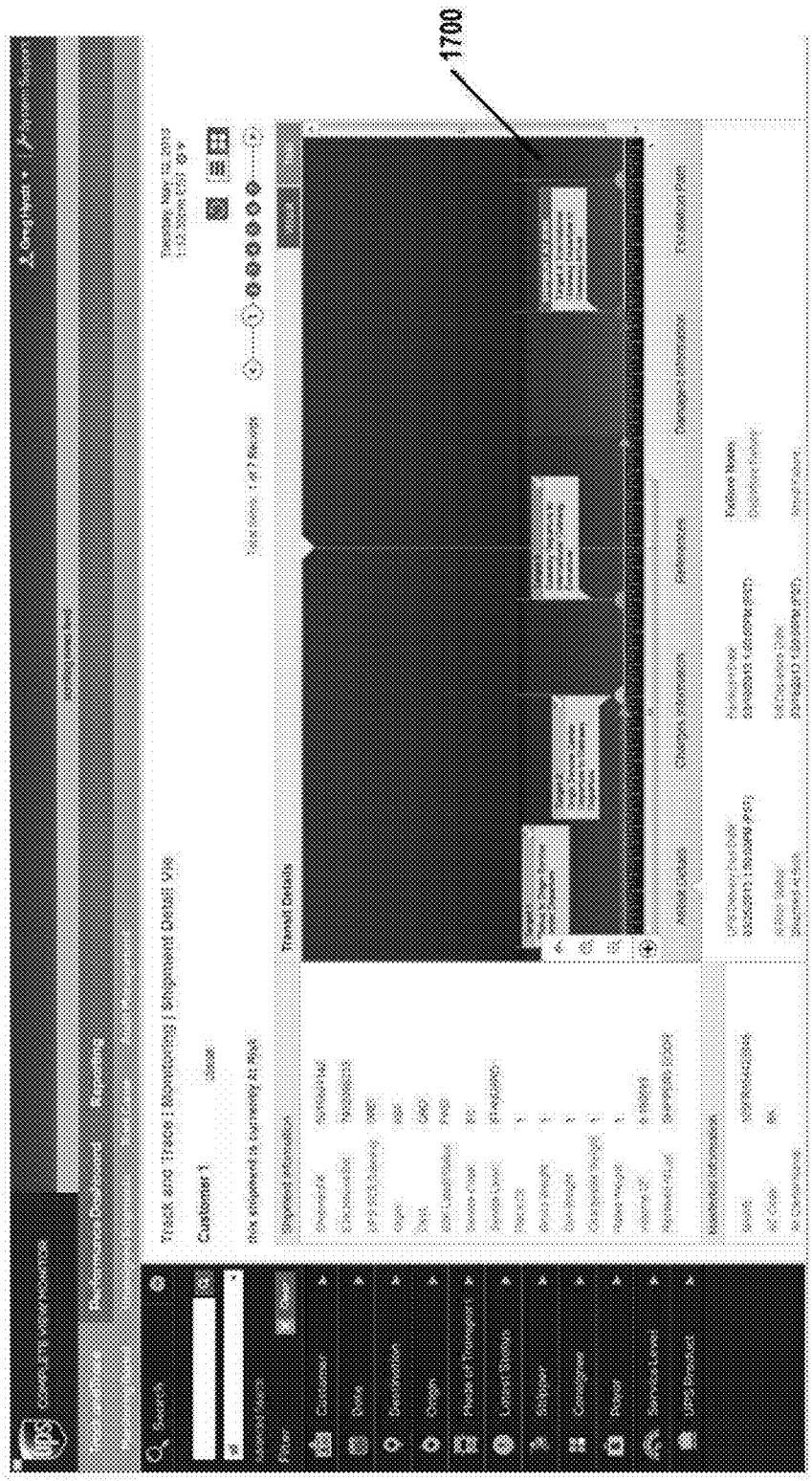

The carrier system 100 can cause display of "at risk" shipping data using display devices associated with one or more user computing entities 110. As shown in FIGS. 15-17, the carrier system 100 may be configured to identify a shipment that missed a deadline at a particular milestone in the shipping process. For example, FIG. 15 shows a summary page available to a user. As shown in FIG. 15, the shipments displayed are grouped into two categories: "at risk" shipments 1501 are grouped and displayed near the top of the page and compliant shipments 1502 are grouped and shown below the "at risk" shipments. A user (e.g., operating a user computing entity 110) can select a shipment identifier 1503 to obtain additional information from the carrier system 100 regarding a particular shipment. For example, FIG. 16 shows an expanded view of information about a particular shipment. As shown in FIG. 16, the carrier system 100 may be configured to cause display of additional detail regarding a specific shipment. The expanded view of information about a particular shipment may include an expanded view of the distressed comments 1600 associated with the particular shipment. The distressed comments may include additional information regarding a particular "at risk" shipment, such as the cause of any associated delay or any relevant comments regarding the shipment.

Figure 18:
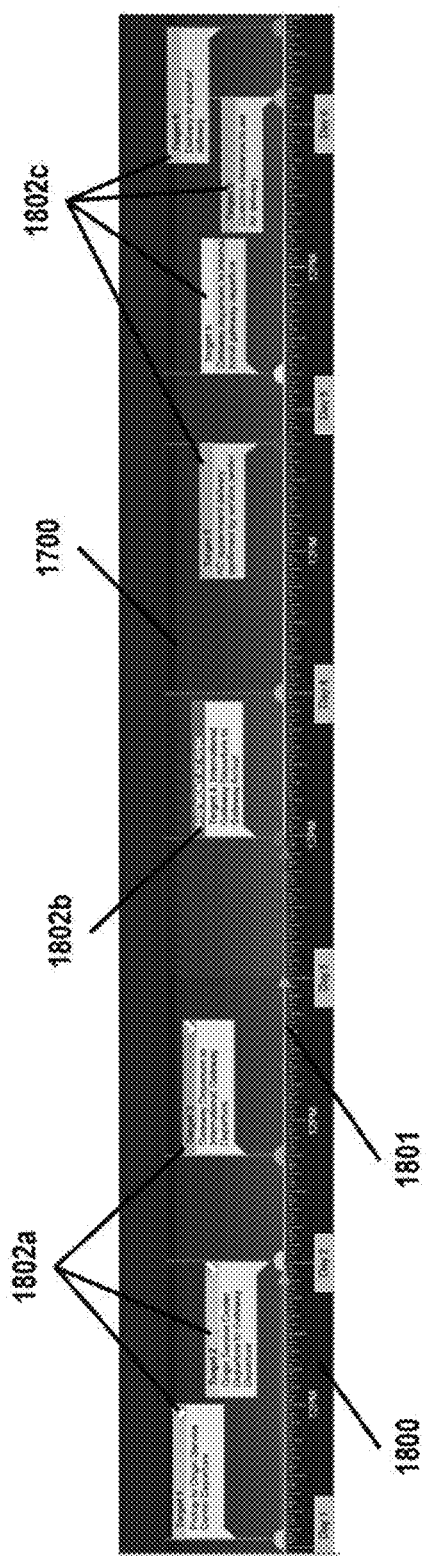

The carrier system 100 may be configured to cause display of details related to a single shipment as shown in FIG. 17. As shown in FIGS. 17 and 18, the carrier system 100 may be configured to generate an illustrated timeline 1700 showing the progress of the selected shipment against the planned shipping route for the shipment. The timeline 1700 may include a displayed time indicator bar 1800 used to show the timing of each event indicated on the timeline 1700. The timeline 1700 may include a progress bar 1801 indicating the milestones that the shipment has previously reached. The timelines 1700 may additionally include a plurality of milestone indicators, 1802a, 1802b, and 1802c. The milestone indicators may indicate the milestone deadlines that have previously been met 1802a, the milestone deadlines that have been missed and have therefore placed the shipment at risk 1802b, the milestone deadlines scheduled at some time in the future 1802c, and/or the like. In various embodiments, these concepts can provide users (e.g., operating a user computing entity 110) with ongoing visibility of all shipments associated with their user profiles. The carrier system 100 may also be configured to cause display of an "at risk" contact person and distressed comments in the detailed view of each "at risk" shipment. The "at risk" contact person may be designated in the shipper/customer profile.

The carrier system 100 may be configured to permit a user to enter a description explaining why a particular shipment reached a milestone after the scheduled deadline via a user computing entity 110. The carrier system 100 may save these descriptions with the shipping data, and the shipment summary module may utilize the shipping data as described in greater detail below. The descriptions may be text descriptions entered by a user (e.g., operating a user computing entity 110) or may be selected from a group of pre-defined textual explanations. Alternatively, the carrier system 100 may utilize previously defined delay codes to describe the reasons for a particular shipment missing a deadline.

In various embodiments, the carrier system 100 may be configured to send an electronic message to a user when the carrier system 100 indicates one or more shipments as "at risk." The carrier system 100 may be configured to generate and send an email message, a voice message, an SMS message, and/or the like to a user computing entity 110 such that the corresponding user can quickly undertake appropriate corrective steps. In certain embodiments, the carrier system 100 may be configured to send a maximum number of "at risk" messages to a user during a predetermined time period. For instance, the carrier system 100 may be configured to send no more than one, two, or three "at risk" messages during a 24-hour period.

Referring back to Blocks 706-707 of FIG. 7, the carrier system 100 may be configured to designate particular shipments as "at risk" regardless of whether they are on schedule. For instance, shipments designated as containing hazardous materials, oversized items, temperature sensitive items, items with a particular shipping service level, or items destined for certain countries may remain designated as "at risk" during the entire shipping cycle. As an additional example, shipments containing damaged items, shipments with missing documentation, shipments with missing or lost items, or shipments not on board a scheduled transporter (e.g., vehicle 105 or aircraft 106) may be designated as "at risk" shipments. As yet another example, the carrier system 100 may designate shipments that are astray or off course, shipments subject to a credit hold, and shipments delayed due to a natural catastrophe or labor issues as "at risk" shipments. The carrier system 100 may also be configured to designate shipments with only a portion of contained items available for delivery, out for delivery, or currently delivered to be "at risk" if a portion of the items are estimated to be delivered after the delivery deadline. Moreover, for shipments requiring a delivery appointment, the carrier system 100 may be configured to indicate those shipments that are estimated to arrive at the consignee destination prior to the appointment window to be "at risk" shipments.

In various embodiments, the carrier system 100 may be configured to remove the "at risk" designation from shipments that later arrive at a milestone prior to a scheduled deadline, and therefore return to schedule. Moreover, in various embodiments, the carrier system 100 may be configured to remove the "at risk" designation for a particular shipment in response to a user input. Moreover, in various embodiments, the carrier system 100 may be configured to designate particular shipments for various levels of review. For instance, the carrier system 100 may receive a user input designating a particular shipment for later follow up or for review by another user. In various embodiments, the user interface of the carrier system 100 may indicate flagged shipments by placing a colored bar beside a shipment summary, changing the text color of the shipment summary, and/or using similar means capable of indicating the flagged status to a user (e.g., using a user computing entity 110). As will be understood by one skilled in the art, the carrier system 100 may be configured to automatically designate particular shipments for review in response to certain events or occurrences.

At Block 716 of FIG. 7, the carrier system 100 may be configured to receive user inputs describing the root cause of an item arriving at a consignee destination without complying with predetermined, customer-defined shipping requirements. The carrier system 100 may also be configured to provide a notification to a predefined shipment contact person, as defined in the shipper/customer profile, in the event that a shipment arrives at a consignee destination without complying with the predefined customer-defined shipping requirements stored in the associated shipper/customer profile. In addition to assigning a root cause for a particular shipment arriving in violation of a customer shipping requirement, the carrier system 100 may also be configured to receive information designating the root cause as controllable by the carrier or not controllable by the carrier. In certain embodiments, the carrier system 100 may be configured to automatically determine whether the root cause was controllable or not controllable based on the content of the root cause description. For example, if a shipment arrives at a destination late due to an unexpected natural disaster, the carrier system 100 may be configured to determine that the root cause is not controllable by the carrier. In other embodiments, the carrier system 100 may be configured to receive a user input designating the root cause as controllable or not controllable by the carrier. The item tracking procedure ends at Block 717, and the carrier system 100 may store the shipping data for later access.

According to various embodiments, the carrier system 100 may flag or otherwise indicate those shipments that may arrive at their respective destinations in violation of customer-defined shipping requirements using methods and designations significantly different from those described above. For example, instead of designating shipments as "at risk," the carrier system 100 may display shipping data related to those shipments in a color different from those shipments likely to arrive in compliance with their respective customer-defined shipping requirements. The carrier system 100 may also receive shipping requirement information as input directly from individual shippers/customers, for instance, by using one or more shipper/customer-provided computerized forms.

Shipment Summary

The carrier system 100 may be configured to store shipping data for all shipments both currently in transit and previously delivered. This shipping data may be searchable by users (e.g., using a user computing entity 110). In certain embodiments, the carrier system 100 may be configured to perform searches for specific shipments using various shipment characteristics in response to user inputs. In certain embodiments, the carrier system 100 may search for shipments using one or more of the following: (1) an activity occurring during a specified date range, (2) a specified reference indicator (e.g., a shipment identifier, a shipper/customer identifier, and/or the like), (3) a specified mode of transportation (e.g., air, ocean, or ground), (4) a party associated with a shipment (e.g., shipper, consignee, payer), (5) an origin location, (6) a destination location, (7) a latest status, (8) a shipper name, (9) a customer profile associated with a specified shipper, (10) a consignee name, (11) a customer profile associated with a specified consignee, (12) a payer name, (13) a customer profile associated with a specified payer, (14) a service level, (15) a carrier service product (e.g., temperature sensitive shipping), and/or the like.

Referring now to FIGS. 19-22, the carrier system 100 may be configured to determine summary performance data for shipments based at least in part on the stored shipping data. The carrier system 100 may be configured to sort summary performance data by various data characteristics. For instance, the carrier system 100 may cause display of summary performance data for: (1) all of the shipments associated with a particular user profile, (2) all of the shipments associated with a particular shipper/customer, (3) all of the shipments associated with a particular customer subunit (e.g., business group within a customer), (4) all of the shipments using a particular carrier service level, (5) all of the shipments using a particular mode of transportation (e.g., air, ocean, or ground), (6) all of the shipments moving through a particular gateway (e.g., a specified airport), (7) all of the shipments originating at a particular service center, (8) all of the shipments destined for a particular service center.

When determining a summary of a particular group of shipments, the carrier system 100 may be configured to determine one or more summary data points such as: (1) the total number of shipments, (2) the total chargeable weight, (3) the total number of on-time shipments, (4) the total number of late shipments, (5) the total number of exceptions, (6) customer gross OTP (On-Time Percentage—the total number of on-time shipments divided by the total number of shipments for a particular customer), (7) percentage of on-time shipments, (8) net OTP (the total number of on-time shipments and total number of non-chargeable delays, collectively divided by the total number of shipments for a particular customer), (9) percentage of on-time and non-controllably delayed shipments, (10) sum of air freight charges, (11) sum of fuel charges, (12) sum of security charges, (13) sum of total charges, and/or the like. In various embodiments, the carrier system 100 may be configured to generate a summary report comprising one or more summary data points.

Figure 19:
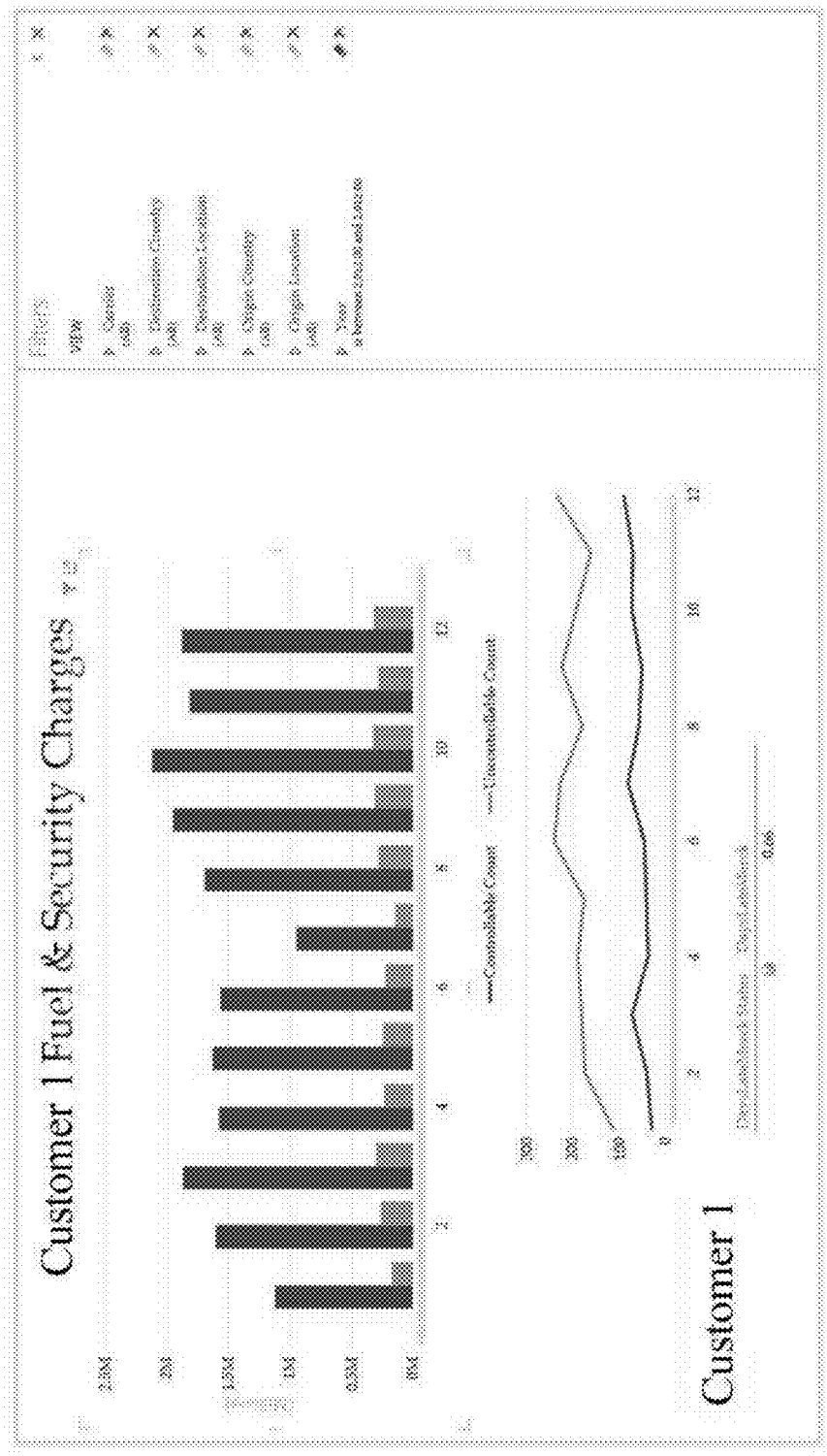
Figure 20:
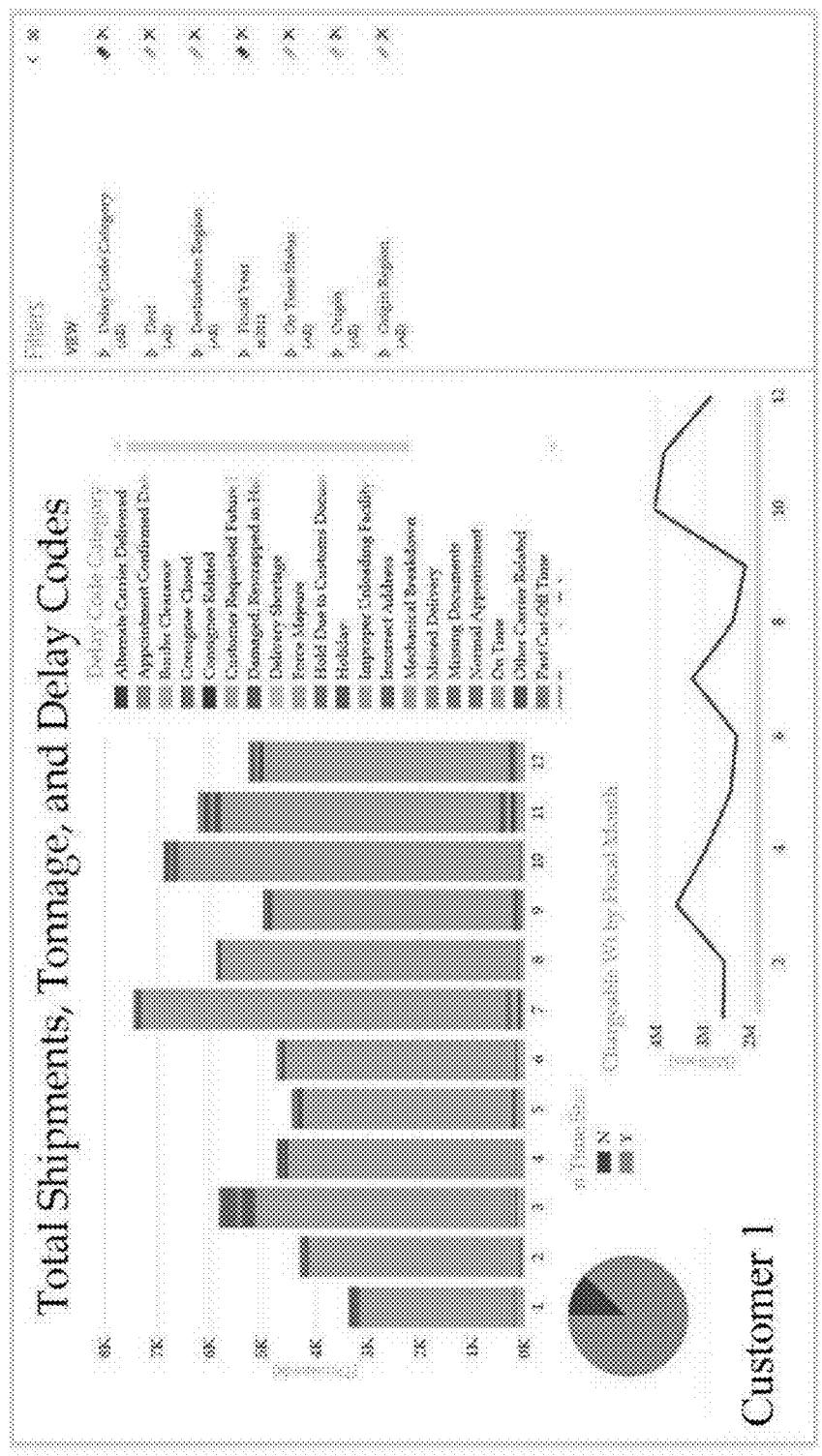
Figure 21:
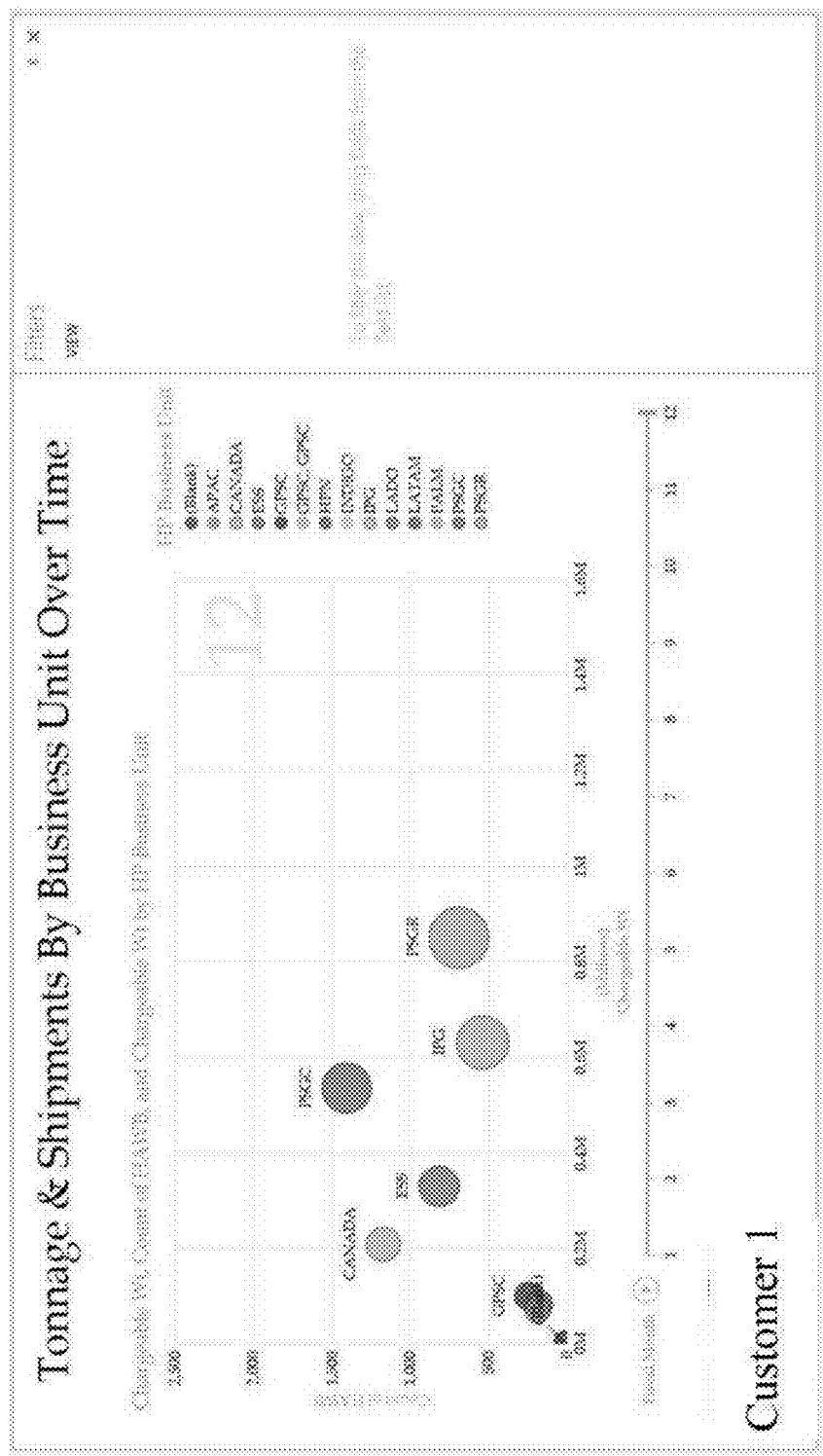
Figure 22:
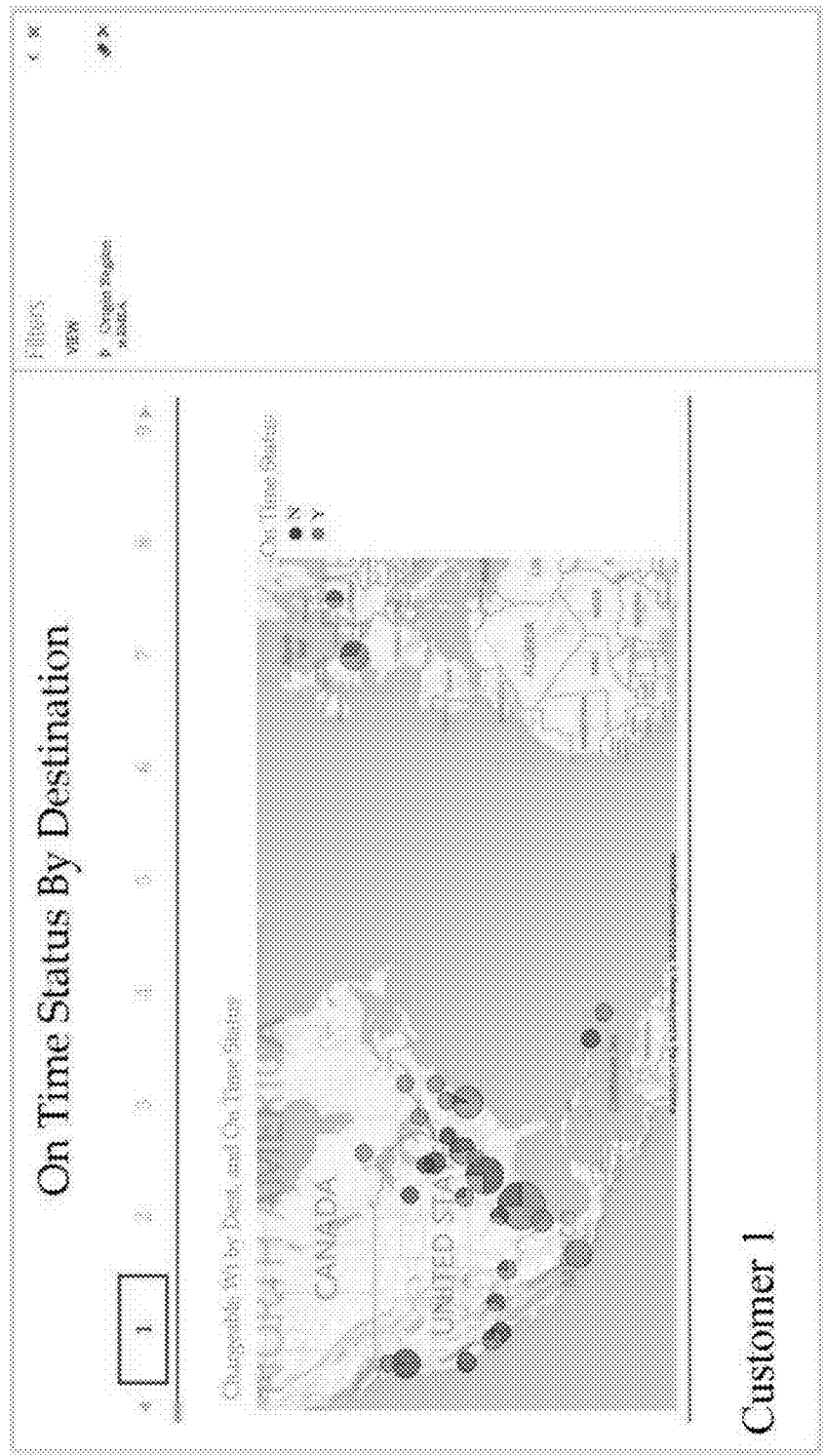

FIG. 19 shows an exemplary carrier system 100 output summary report showing the total number of "controllable" and "uncontrollable" events related to a single shipper/customer. The exemplary embodiments shown in FIGS. 20 and 21 show additional carrier system 100 outputs including additional detail regarding shipments associated with a particular shipper/customer. As shown in FIG. 20, the carrier system 100 may be configured to graphically display the total number of shipments, tonnage, and delay codes associated with shipments for a particular customer. FIG. 21 is an additional view of a graphical summary showing the number of shipments associated with various subunits of a particular shipper/customer. As shown in FIG. 22, the carrier system 100 may also be configured to sort and graphically display the number of on-time shipments for each of a variety of destinations. As will be understood by those skilled in the art, the carrier system 100 may be configured to output a variety of other graphical displays to summarize a specified group of shipments.

CONCLUSION

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A self-configuring shipment monitoring system for monitoring a plurality of shipments comprising one or more memory storage areas and at least one processor, the system configured to:
   store, at a centralized database associated with a carrier server, a plurality of customer profiles, wherein each of the plurality of customer profiles (a) corresponds to a customer and (b) stores customer-defined shipping requirements for the corresponding customer;
   receive, via a network, shipping data for a plurality of shipments being transported by a transporter, the shipping data for each of the plurality of shipments comprising a transporter identifier corresponding to the transporter;
   modify at least a portion of the customer-defined shipping requirements stored in customer profiles applicable to each of the plurality of shipments into executable compliance requirements configured for monitoring subsequently received tracking data corresponding to each of the plurality of shipments, wherein the executable compliance requirements comprise a plurality of time and location-specific milestone deadlines for each of the plurality of shipments;
   automatically decode, by an electronic control module device, real-time tracking data for the transporter received from a location sensor and a telematics sensor, associated with the transporter, wherein the transporter is a single transporter, and wherein the real-time tracking data comprises data uniquely identifying the transporter and identifying a current geolocation of the transporter, and time data identifying the time of generation of the real-time tracking data, and wherein the real-time tracking data received from the telematics sensor includes real-time attributes of the first transporter;
   present the decoded real-time tracking data to a communication bus to transfer the data to a data collection device;
   transmit, by the data collection device, the decoded real-time tracking data to the carrier server,
   based at least in part on the decoded real-time tracking data received at the carrier server, generate an interactive user interface comprising a graphical display for presentation on a remote user computing entity, the graphical display comprising a geographical map and a transporter indicator representing the current geolocation of the transporter on the geographical map;
   programmatically execute a plurality of compliance requirements each corresponding to one of the plurality of shipments, wherein the plurality of compliance requirements are executed based at least in part on the decoded real-time tracking data to identify one or more at risk shipments of the plurality of shipments, wherein compliance with the plurality of compliance requirements for the plurality of shipments on the transporter is determined based on the real-time tracking data for the transporter, and wherein the one or more at risk shipments are in violation of milestone deadlines applicable to the at risk shipments;
   based at least in part on the identifying of the one or more at risk shipments, automatically modify the graphical display to indicate in real time the one or more at risk shipments onboard the transporter, wherein modifying the graphical display comprises modifying an appearance of the transport indicator, thereby enabling the user to view progress of the one or more at risk shipments;
   subsequent to the modifying of the display, receive user input via the interactive user interface indicative of corrective action to correct the first shipment to comply with the customer-defined shipping requirements; and
   responsive to the receiving of the user input, remove the modification of first transporter indicator in the graphical display to indicate that the first shipment is no longer at risk of failing to comply with the customer-defined shipping requirements.

2. The system according to claim 1, wherein the customer-defined shipping requirements comprise at least a shipping lane.

3. The system according to claim 2, wherein the transporter comprises an aircraft.

4. The system according to claim 3, wherein the system is further configured to:
   determine whether the shipping data for a first shipment indicates that the first shipment is in compliance with the customer-defined shipping requirements applicable to the first shipment based at least in part on the shipping data and the customer-defined shipping requirements.

5. The system according to claim 4, wherein the system is further configured to determine customer-defined shipping requirements applicable to the first shipment based at least in part on the shipping data.

6. The system according to claim 5 wherein the system is further configured to generate an alert in response to a determination that the first shipment is not in compliance with the customer-defined shipping requirements applicable to the first shipment.

7. A method for configuring a shipment monitoring system configured for monitoring a plurality of shipments comprising the following steps:
   storing, at a centralized database, a plurality of customer profiles, wherein each of the plurality of customer profiles (a) corresponds to a customer and (b) stores customer-defined shipping requirements for the corresponding customer;
   receiving, via one or more processors, shipping data for a plurality of shipments being transported by a transporter, the shipping data for each of the plurality of shipments comprising a transporter identifier corresponding to the transporter;
   modifying, via the one or more processors, at least a portion of the customer-defined shipping requirements stored in customer profiles applicable to each of the plurality of shipments into executable compliance requirements configured for monitoring subsequently received location data corresponding to each of the plurality of shipments, wherein the executable compliance requirements comprise a plurality of time and location-specific milestone deadlines for each of the plurality of shipments;
   receiving, via the one or more processors and via communication from a data collection device onboard the transporter, real-time location data for the transporter decoded from sensor data by an electronic control module onboard the transporter, wherein the transporter is a single transporter, and wherein the location data comprises data identifying a current location of the transporter, and time data identifying the time of generation of the location data;

providing a graphical display for presentation on a remote user computing entity, the graphical display comprising a geographical map and a transporter indicator representing the location of the transporter on the geographical map;

programmatically executing, via the one or more processors, a plurality of compliance requirements each corresponding to one of the plurality of shipments, wherein the plurality of compliance requirements are executed based at least in part on subsequently received real-time location data for the transporter to identify one or more at risk shipments of the plurality of shipments, wherein compliance of each of the plurality of shipments on the transporter is determined based on the real-time location data for the transporter, and wherein the one or more at risk shipments are in violation of milestone deadlines applicable to the at risk shipments;

modifying, via the one or more processors, the graphical display to indicate in real time the one or more at risk shipments onboard the transporter, wherein modifying the graphical display comprises modifying an appearance of the transport indicator, thereby enabling the user to view progress of the one or more at risk shipments;

automatically generating and transmitting an electronic message to a user computing entity indicating that a shipment of the one or more at risk shipments is designated as an at risk shipment;

subsequent to transmitting the electronic message, receiving a user input comprising an instruction to remove the at risk designation from the shipment;

responsive to receiving the user input, removing the at risk designation from the shipment.

8. The method according to claim 7, wherein the customer-defined shipping requirements comprise at least a shipping lane.

9. The method according to claim 8, wherein the transporter comprises an aircraft.

10. The method according to claim 9, further comprising the step of:

determining whether the shipping data for a first shipment indicates that the first shipment is in compliance with the customer-defined shipping requirements applicable to the first shipment based at least in part on the shipping data and the customer-defined shipping requirements.

11. The method according to claim 10, further comprising the step of:

determining customer-defined shipping requirements applicable to the first shipment based at least in part on the shipping data.

12. The method according to claim 11, further comprising the step of:

generating an alert in response to a determination that the first shipment is not in compliance with the customer-defined shipping requirements applicable to the first shipment.

13. A non-transitory computer readable storage medium comprising computer executable instructions for:

storing a plurality of customer profiles in a centralized database, wherein each of the plurality of customer profiles (a) corresponds to a customer and (b) stores customer-defined shipping requirements for the corresponding customer;

receiving, via a network, shipping data for a plurality of shipments being transported by a transporter, the shipping data for each of the plurality of shipments comprising a transporter identifier corresponding to the transporter;

modifying at least a portion of the customer-defined shipping requirements stored in customer profiles applicable to each of the plurality of shipments into executable compliance requirements configured for monitoring subsequently received location data corresponding to each of the plurality of shipments, wherein the executable compliance requirements comprise a plurality of time and location-specific milestone deadlines for each of the plurality of shipments;

receiving, via communication from a location sensor onboard the transporter, real-time location data for the transporter decoded from sensor data by an electronic control module onboard the transporter, wherein the transporter is a single transporter, and wherein the location data comprises data identifying a current location of the transporter, and time data identifying the time of generation of the location data;

providing a graphical display for presentation on a remote user computing entity, the graphical display comprising a geographical map and a transporter indicator representing the location of the transporter on the geographical map;

programmatically executing a plurality of compliance requirements each corresponding to one of the plurality of shipments, wherein the plurality of compliance requirements are executed based at least in part on subsequently received real-time location data for the transporter to identify one or more at risk shipments of the plurality of shipments, wherein compliance of each of the plurality of shipments on the transporter is determined based on the real-time location data for the transporter, and wherein the one or more at risk shipments are in violation of milestone deadlines applicable to the at risk shipments; and modifying the graphical display to indicate in real time the one or more at risk shipments onboard the transporter, wherein modifying the graphical display comprises modifying an appearance of the transport indicator, thereby enabling the user to view progress of the one or more at risk shipments;

subsequent to modifying the graphical display, receiving user input, via the remote user computing entity, indicative of corrective action to correct a shipment of the one or more at risk shipments to comply with the customer-defined shipping requirements;

responsive to receiving the user input, removing the modification of the appearance of the transport indicator to indicate that the shipment is no longer at risk of failing to comply with the customer-defined shipping requirements.

14. The non-transitory computer readable storage medium according to claim 13, wherein the customer-defined shipping requirements comprise at least a shipping lane.

15. The non-transitory computer readable storage medium according to claim 14, wherein the transporter comprises an aircraft.

16. The non-transitory computer readable storage medium according to claim 15, further including computer executable instructions for:

determining whether the shipping data for a first shipment indicates that the first shipment is in compliance with the customer-defined shipping requirements applicable to the first shipment based at least in part on the shipping data and the customer-defined shipping requirements.

17. The non-transitory computer readable storage medium according to claim 16, further including computer executable instructions for:

determining customer-defined shipping requirements applicable to the first shipment based at least in part on the shipping data.

18. The non-transitory computer readable storage medium according to claim 17, further including computer executable instructions for:

generating an alert in response to a determination that the first shipment is not in compliance with the customer-defined shipping requirements applicable to the first shipment.

* * * * *

UNITED STATES PATENT AND TRADEMARK OFFICE
CERTIFICATE OF CORRECTION

PATENT NO. : 10,755,225 B2  
APPLICATION NO. : 14/452809  
DATED : August 25, 2020  
INVENTOR(S) : Shannon C. Goodman et al.

Page 1 of 1

It is certified that error appears in the above-identified patent and that said Letters Patent is hereby corrected as shown below:

On the Title Page

In Column 1, item (73), Assignee, Line 2, after "Atlanta" insert -- (US) --.

In the Claims

In Column 31, Line 36, Claim 1, after "of the" delete "first".

In Column 31, Line 40, Claim 1, after "transfer the" insert -- decoded real-time tracking --.

In Column 32, Line 6, Claim 1, delete "the first" and insert -- a --, therefor.

In Column 32, Line 6, Claim 1, after "shipment" insert -- of the one or more at risk shipments --.

In Column 32, Line 9, Claim 1, delete "first" and insert -- the --, therefor.

In Column 32, Line 10, Claim 1, after "that the" delete "first".

In Column 32, Line 62, Claim 7, after "data" insert -- of the transporter --.

In Column 33, Line 4, Claim 7, before "location" insert -- current --.

In Column 34, Line 15, Claim 13, after "sensor data" insert -- of the transporter --.

In Column 34, Line 25, Claim 13, before "location" insert -- current --.

Signed and Sealed this  
Sixth Day of October, 2020

Andrei Iancu  
*Director of the United States Patent and Trademark Office*